Figure 1:
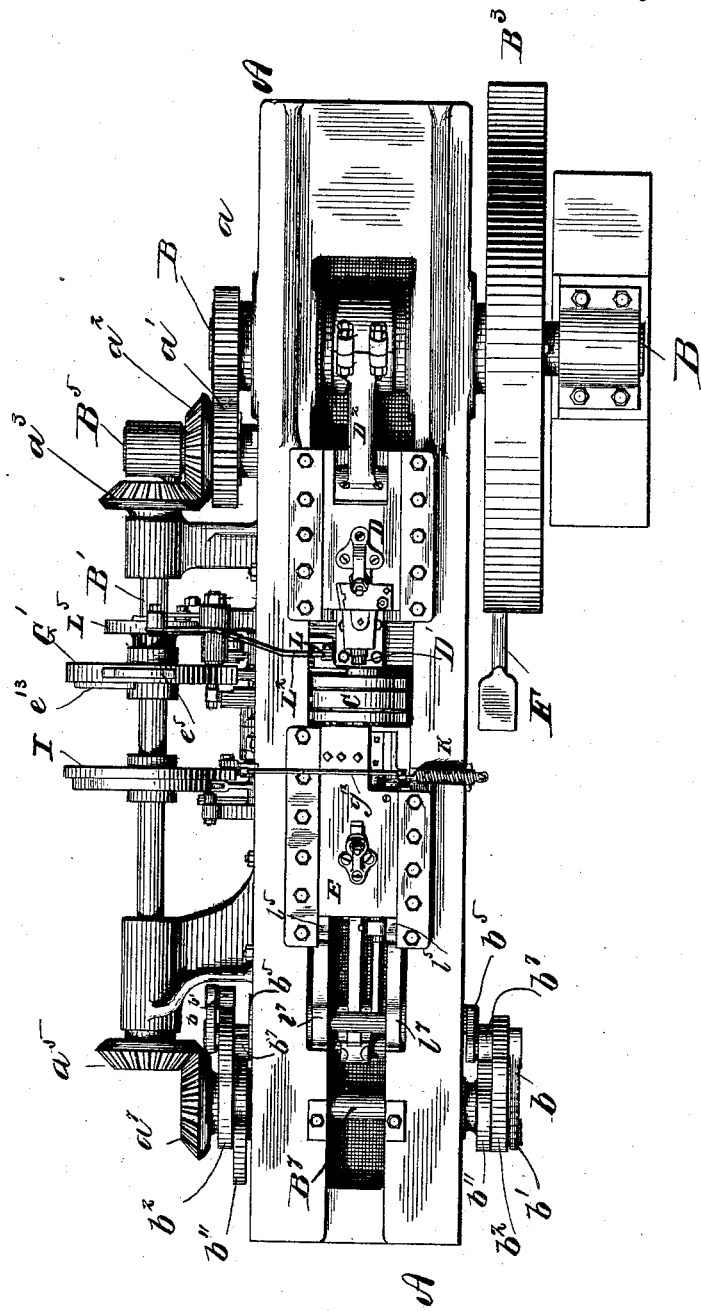

(No Model.) 20 Sheets—Sheet 1.
W. N. WHITELEY & O. E. & A. S. PERRIGO.
BOLT HEADING MACHINE.

No. 383,083. Patented May 15, 1888.

Witnesses:
Inventors (No Model.) 20 Sheets—Sheet 4.
W. N. WHITELEY & O. E. & A. S. PERRIGO.
BOLT HEADING MACHINE.
No. 383,083. Patented May 15, 1888.

(No Model.) 20 Sheets—Sheet 5.
W. N. WHITELEY & O. E. & A. S. PERRIGO.
BOLT HEADING MACHINE.
No. 383,083. Patented May 15, 1888.
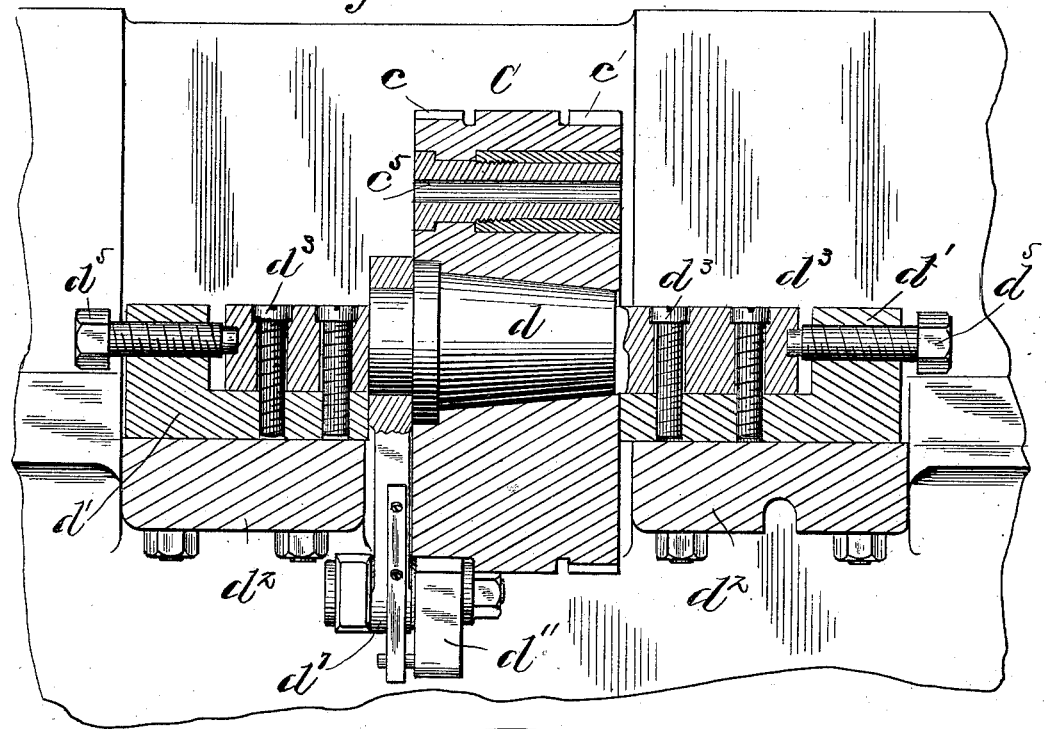
Fig. 5
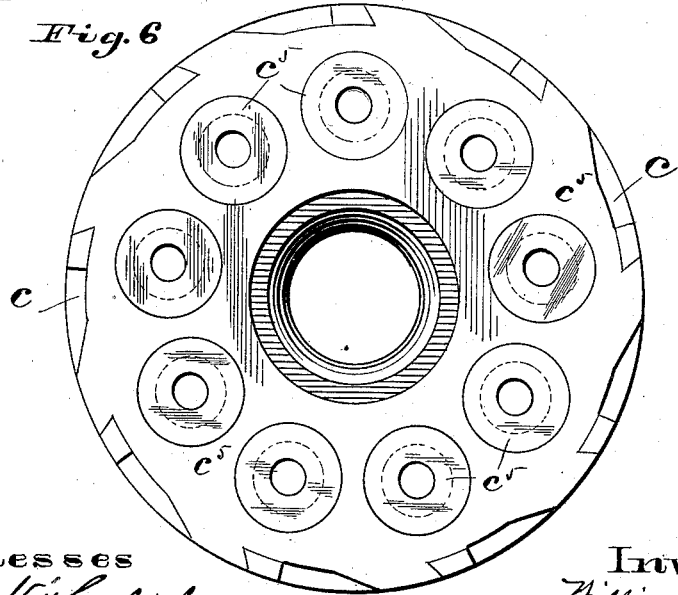
Fig. 6
Fig. 6ᵃ
Witnesses
Inventors
William N. Whiteley
Oscar E. Perrigo
and Albert S. Perrigo

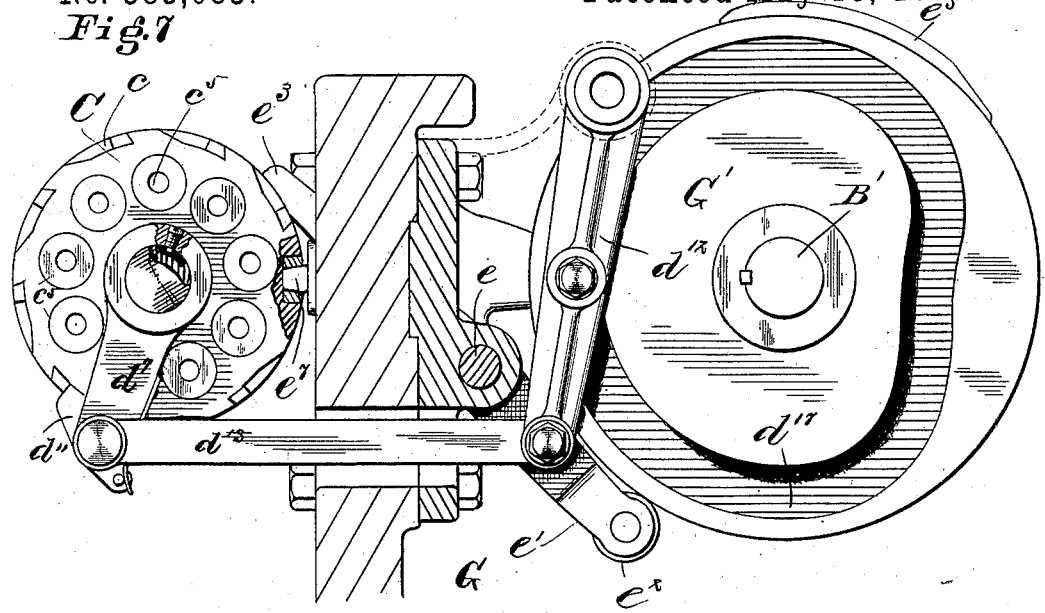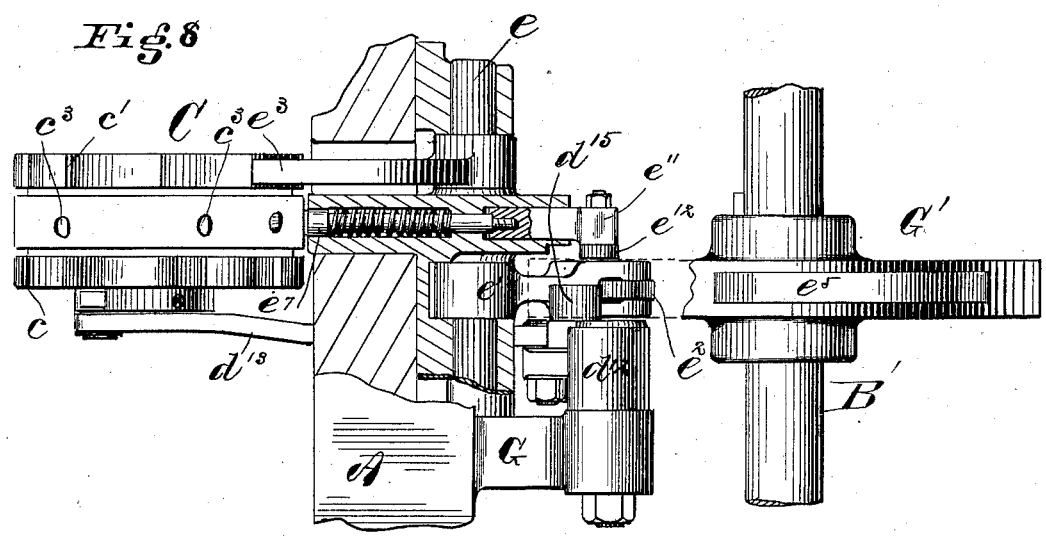

(No Model.) 20 Sheets—Sheet 7.
W. N. WHITELEY & O. E. & A. S. PERRIGO.
BOLT HEADING MACHINE.
No. 383,083. Patented May 15, 1888.

Witnesses.
Jno. W. Hulick.
L. B. Staley.

Inventors.
William N. Whitely.
Oscar E. Perrigo.
Albert S. Perrigo.
By Paul A. Staley, atty.

(No Model.) 20 Sheets—Sheet 8.

W. N. WHITELEY & O. E. & A. S. PERRIGO.
BOLT HEADING MACHINE.

No. 383,083. Patented May 15, 1888.

Witnesses.
Inventors

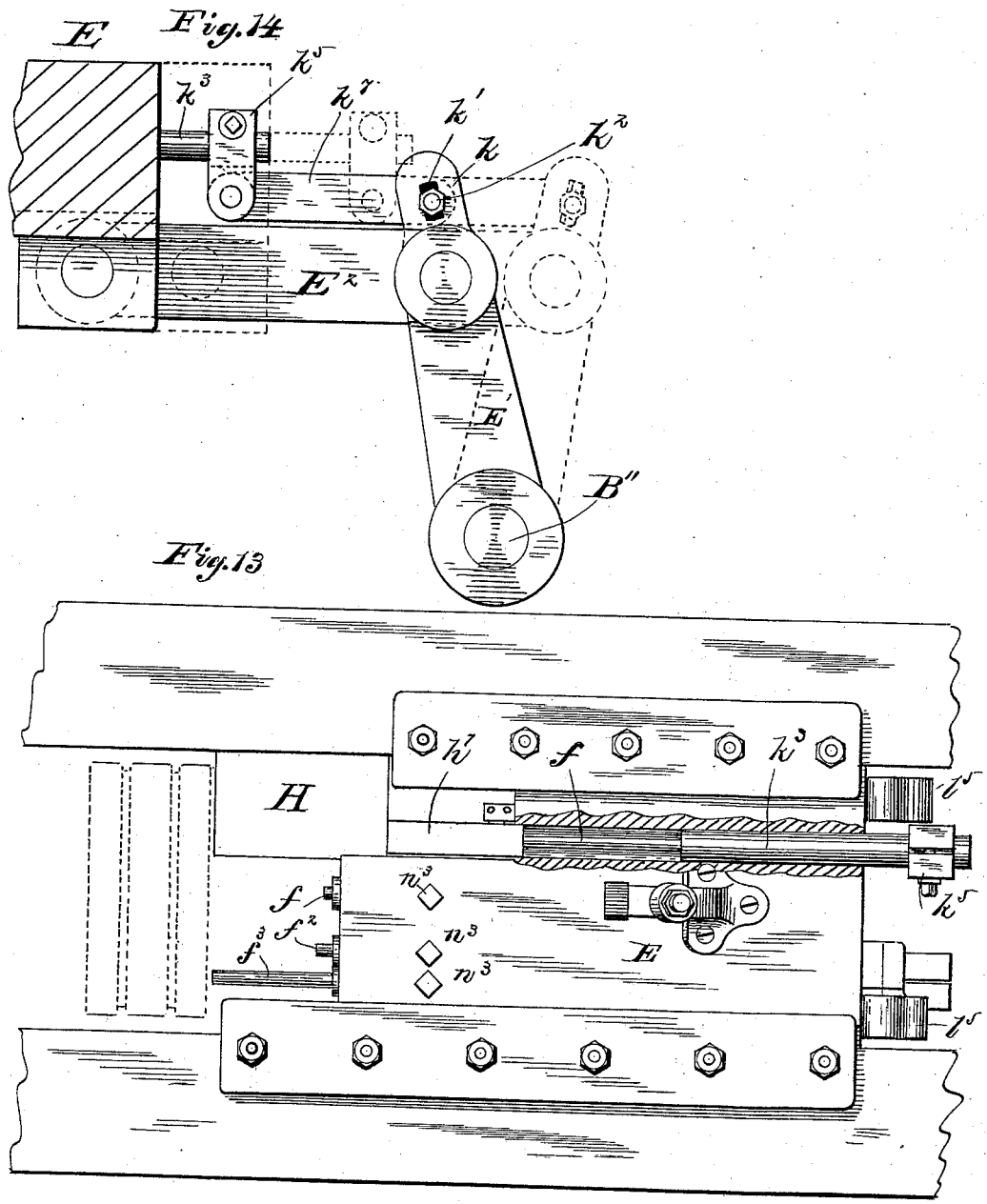

(No Model.) 20 Sheets—Sheet 10.
W. N. WHITELEY & O. E. & A. S. PERRIGO.
BOLT HEADING MACHINE.
No. 383,083. Patented May 15, 1888.
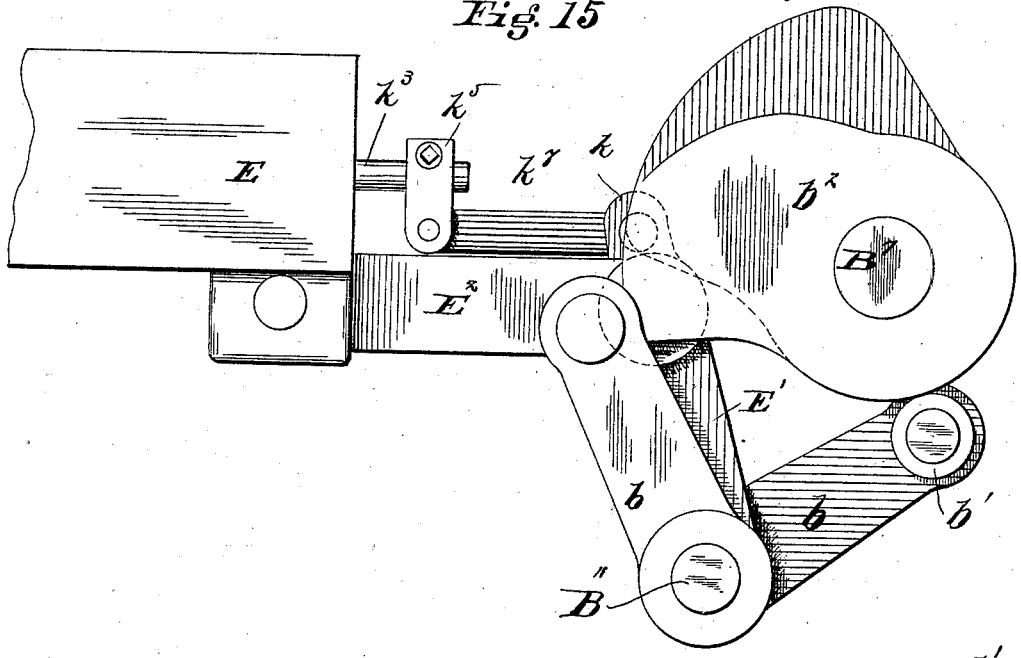

(No Model.) 20 Sheets—Sheet 11.
W. N. WHITELEY & O. E. & A. S. PERRIGO.
BOLT HEADING MACHINE.
No. 383,083. Patented May 15, 1888.
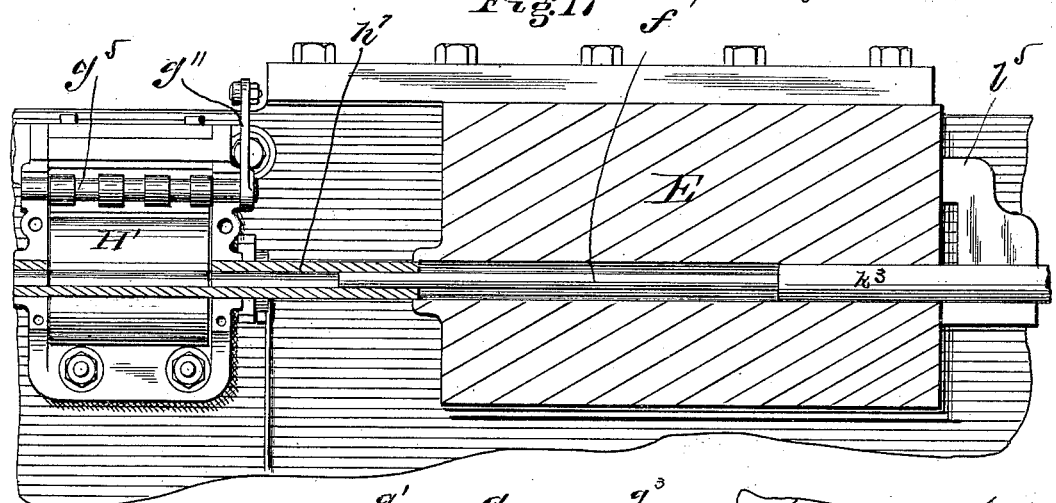
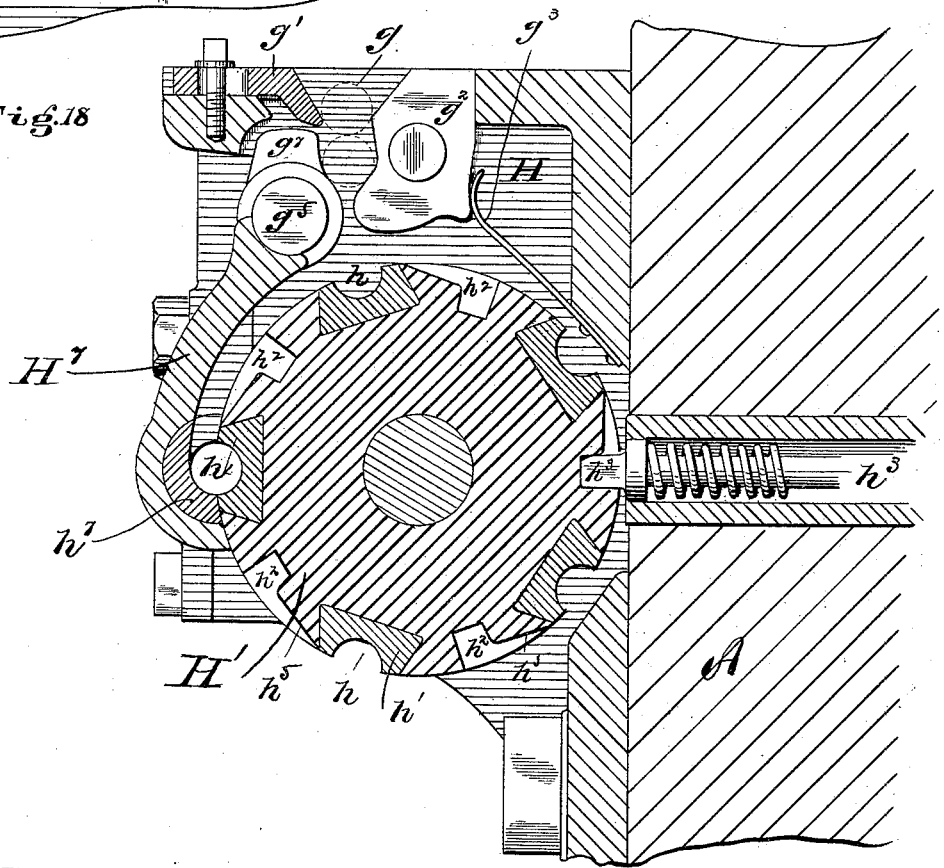
Witnesses.
Inventors

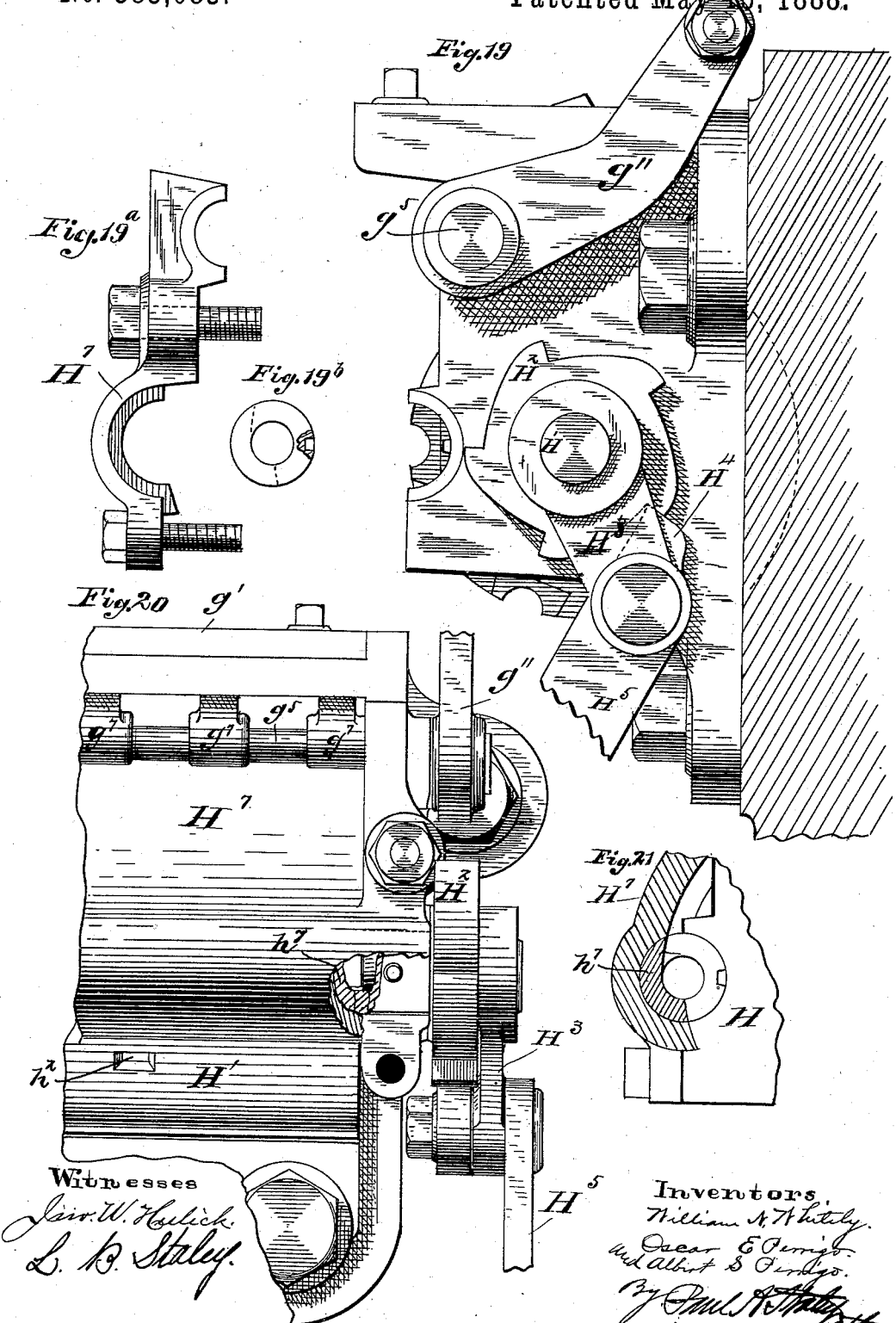

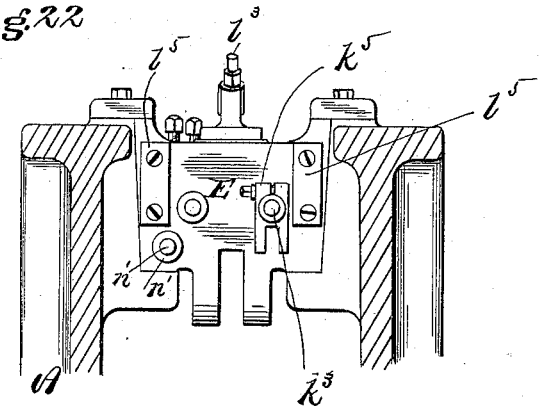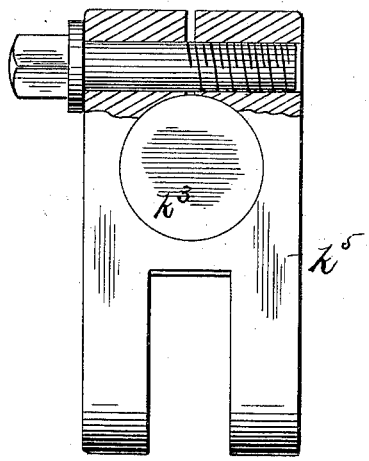

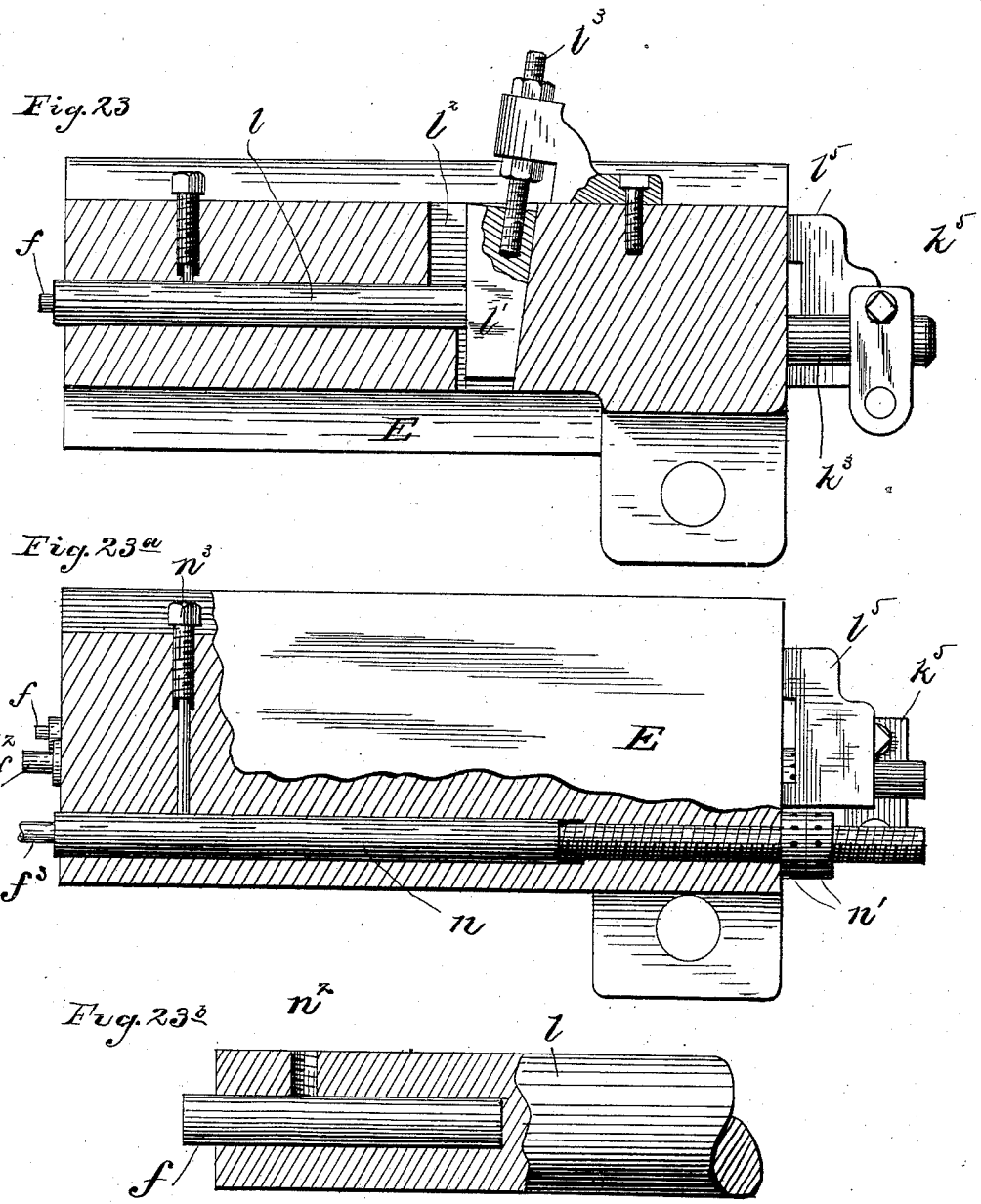

(No Model.) 20 Sheets—Sheet 15.
W. N. WHITELEY & O. E. & A. S. PERRIGO.
BOLT HEADING MACHINE.
No. 383,083. Patented May 15, 1888.
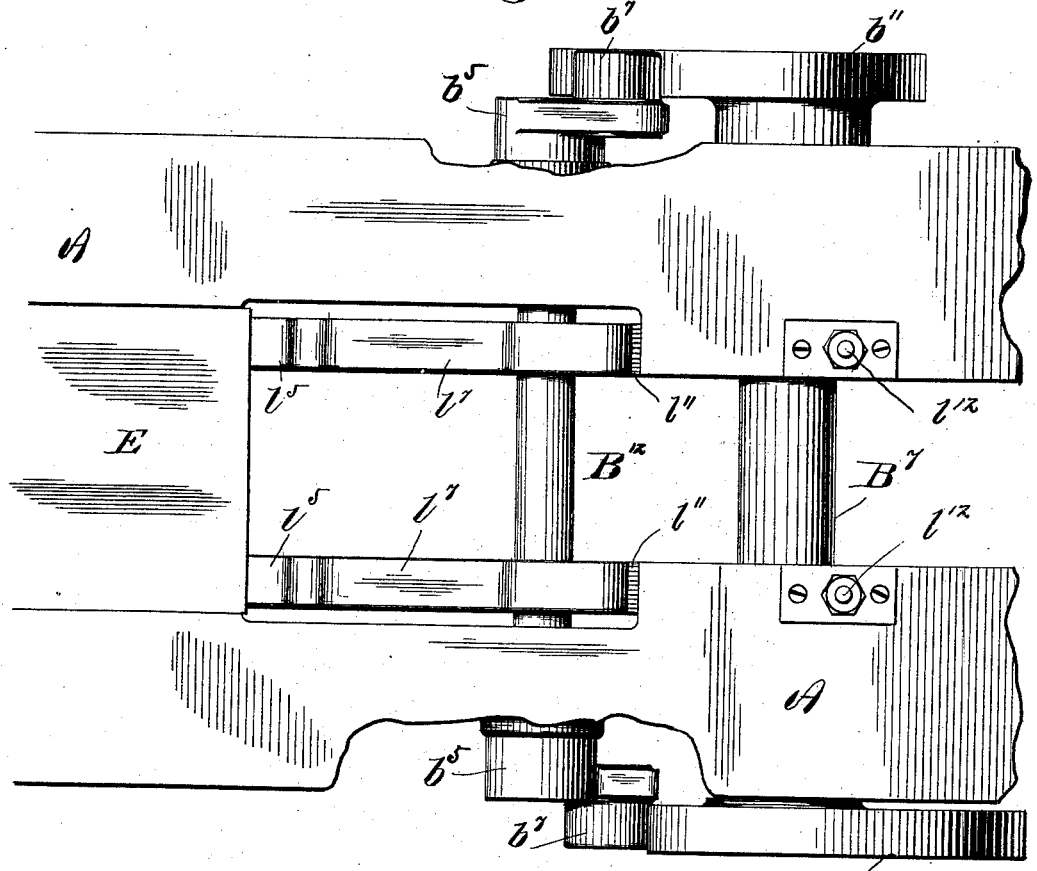
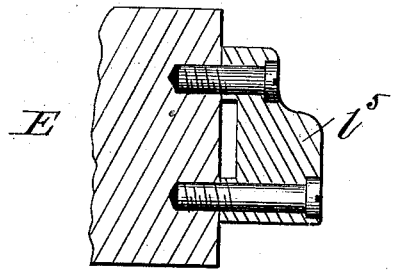
Witnesses. Inventors.

(No Model.) 20 Sheets—Sheet 16.
W. N. WHITELEY & O. E. & A. S. PERRIGO.
BOLT HEADING MACHINE.
No. 383,083. Patented May 15, 1888.
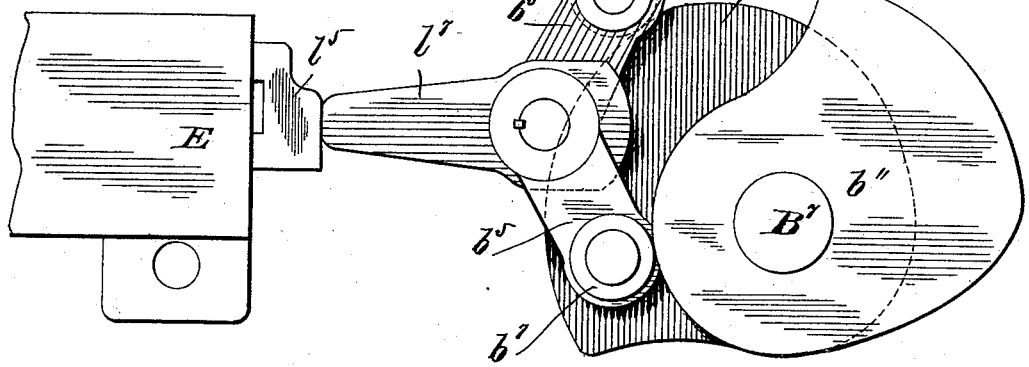
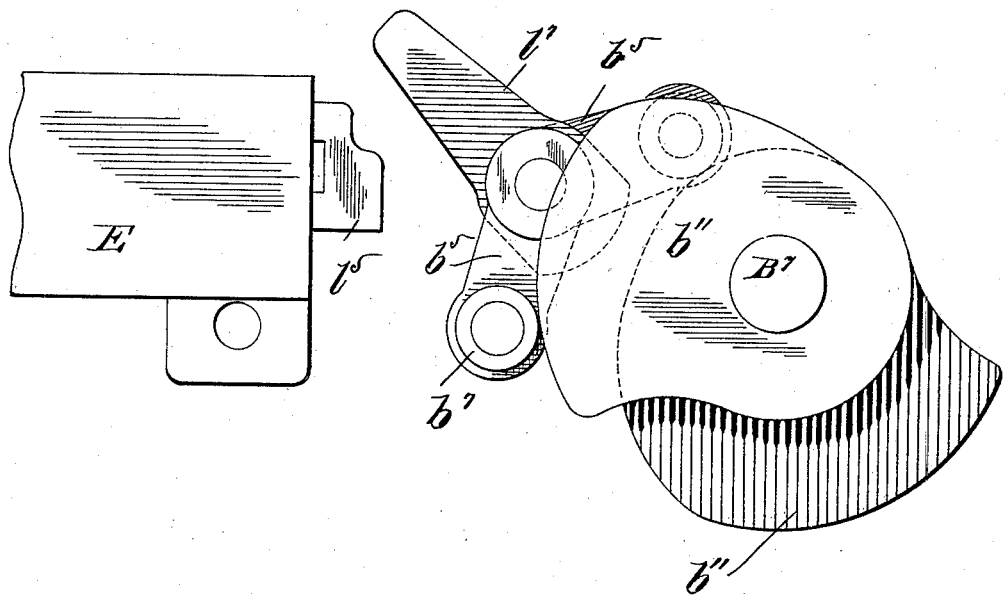

(No Model.) 20 Sheets—Sheet 17.
W. N. WHITELEY & O. E. & A. S. PERRIGO.
BOLT HEADING MACHINE.

No. 383,083. Patented May 15, 1888.

(No Model.) 20 Sheets—Sheet 18.

W. N. WHITELEY & O. E. & A. S. PERRIGO.
BOLT HEADING MACHINE.

No. 383,083. Patented May 15, 1888.

Witnesses
Jno. W. Hadlick.
C. B. Staley.

Inventors.
William N. Whiteley.
Oscar E. Perrigo
and Albert S. Perrigo.
By Paul A. Staley, Atty.

N. PETERS, Photo-Lithographer, Washington, D. C.

(No Model.) 20 Sheets—Sheet 19.

W. N. WHITELEY & O. E. & A. S. PERRIGO.
BOLT HEADING MACHINE.

No. 383,083. Patented May 15, 1888.

Witnesses
Jno. W. Hailick.
C. R. Staly.

Inventors.
William N. Whiteley.
Oscar E. Perrigo.
and Albert S. Perrigo.
By Paul A. Staley
Atty.

(No Model.) 20 Sheets—Sheet 20.
W. N. WHITELEY & O. E. & A. S. PERRIGO.
BOLT HEADING MACHINE.
No. 383,083. Patented May 15, 1888.
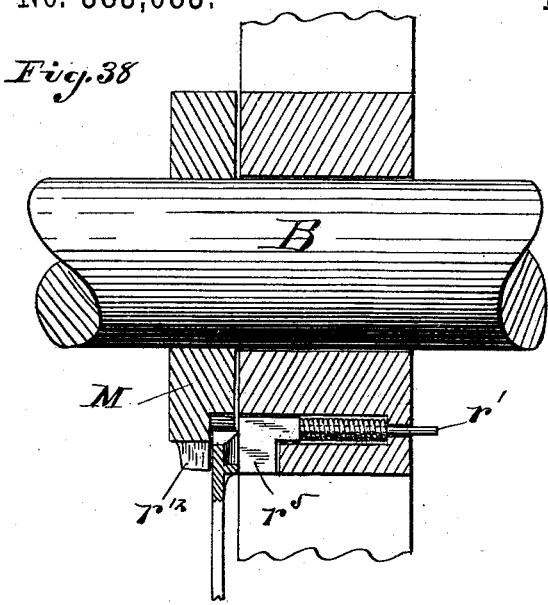
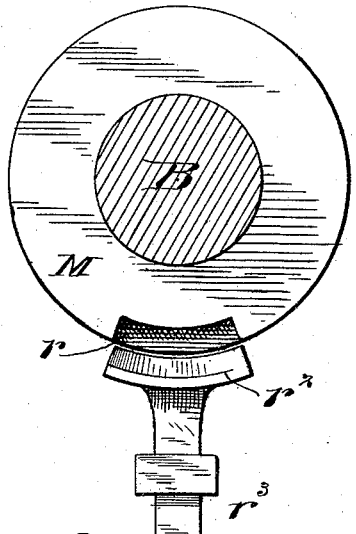
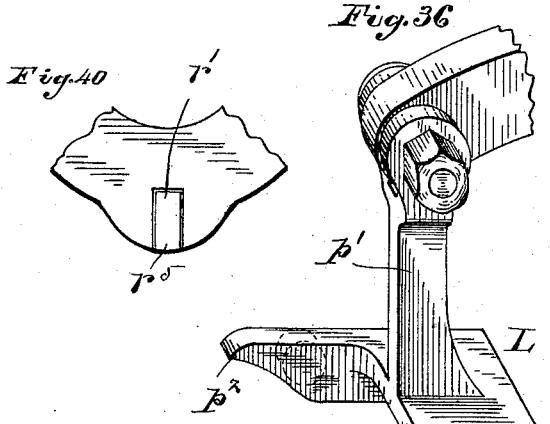
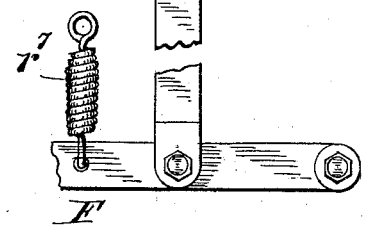
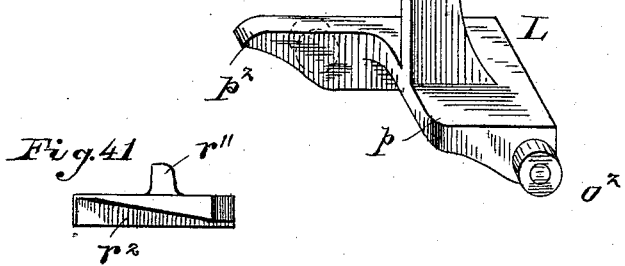
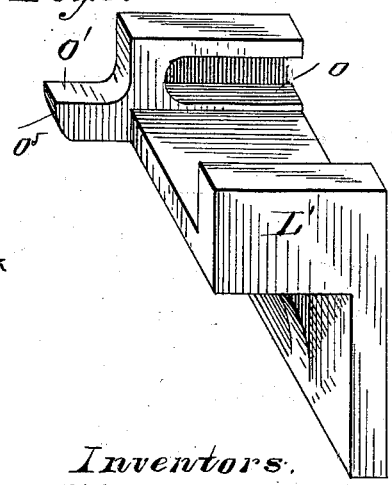
Witnesses
Inventors
William N. Whiteley
Oscar E. Perrigo
and Albert S. Perrigo

UNITED STATES PATENT OFFICE.

WILLIAM N. WHITELEY, OSCAR E. PERRIGO, AND ALBERT S. PERRIGO, OF SPRINGFIELD, OHIO, ASSIGNORS TO SAID WILLIAM N. WHITELEY.

BOLT-HEADING MACHINE.

SPECIFICATION forming part of Letters Patent No. 383,083, dated May 15, 1888.

Application filed January 6, 1887. Serial No. 223,506. (No model.)

*To all whom it may concern:*

Be it known that we, WILLIAM N. WHITELEY, OSCAR E. PERRIGO, and ALBERT S. PERRIGO, citizens of the United States, residing at Springfield, in the county of Clark and State of Ohio, have invented certain new and useful Improvements in Bolt-Heading Machinery, of which the following is a specification.

Our invention relates to improvements in bolt-making machinery, and the object is to provide a bolt-heading machine the organization and construction of which is such that at each stroke of the machine a series of operations are automatically performed, by which sufficient stock to form a bolt is fed to the machine, a head formed thereon, and the bolt thus formed discharged from the machine, means being furnished by which a continuous operation of the machine may be secured and a bolt completed at each stroke thereof.

Our invention consists in arranging a series of dies in a revolving cylinder in front of a reciprocating hammer and providing means for revolving said cylinder a portion of a revolution after each stroke of the hammer and for holding the same so that the dies are brought successively in front of the hammer during one stroke thereof and ejecting the bolt-blank which has been headed by a previous stroke and carried to a proper position by a partial revolution of the die-cylinder.

Our invention further consists in arranging, in connection with the revolving cylinder and the dies therein, an automatic feeding device so constructed as to automatically feed the stock for a bolt into each successive die during the intermission in the revolution of the cylinder.

Our invention further consists in various constructions and combinations of parts hereinafter described and claimed.

Figure 2:
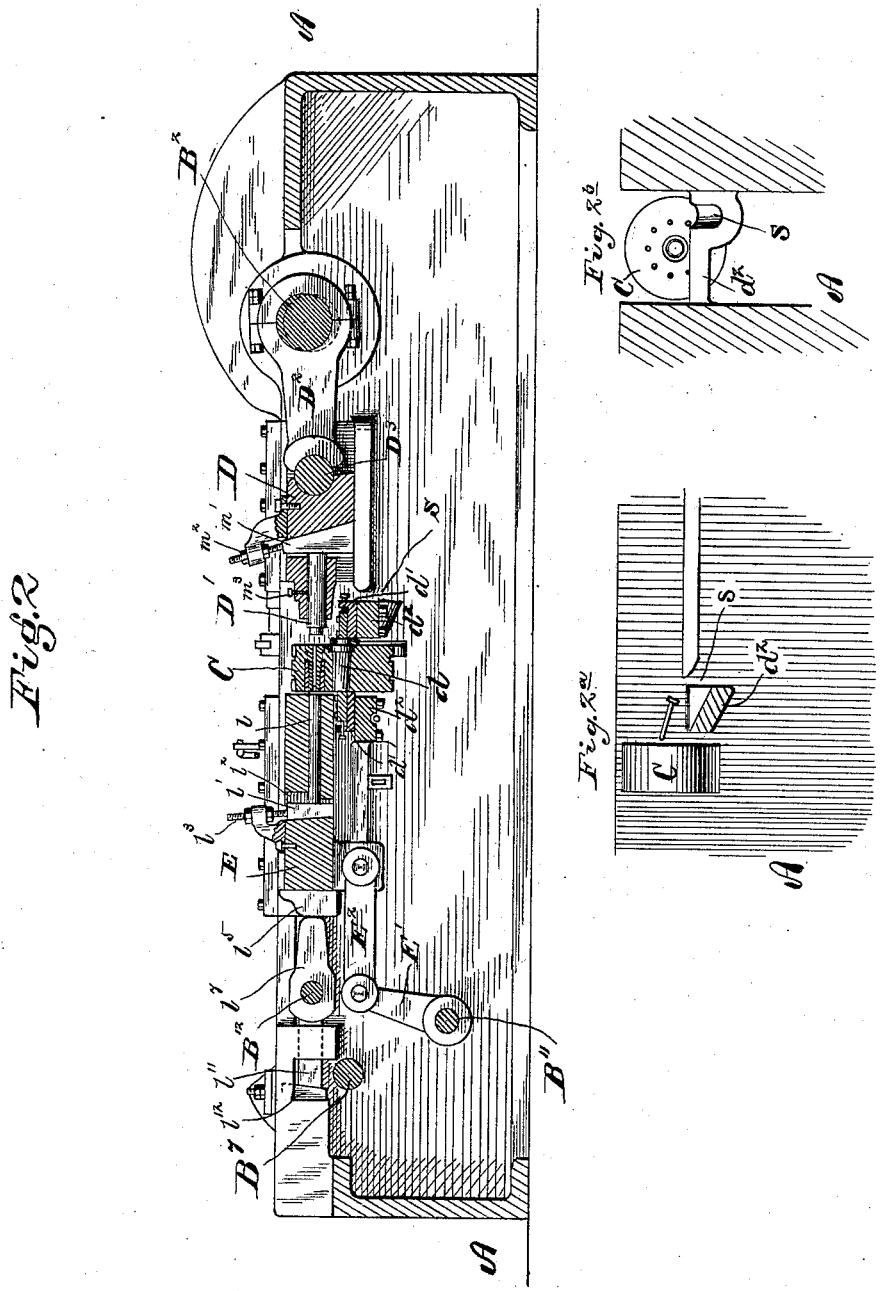
Figure 3:
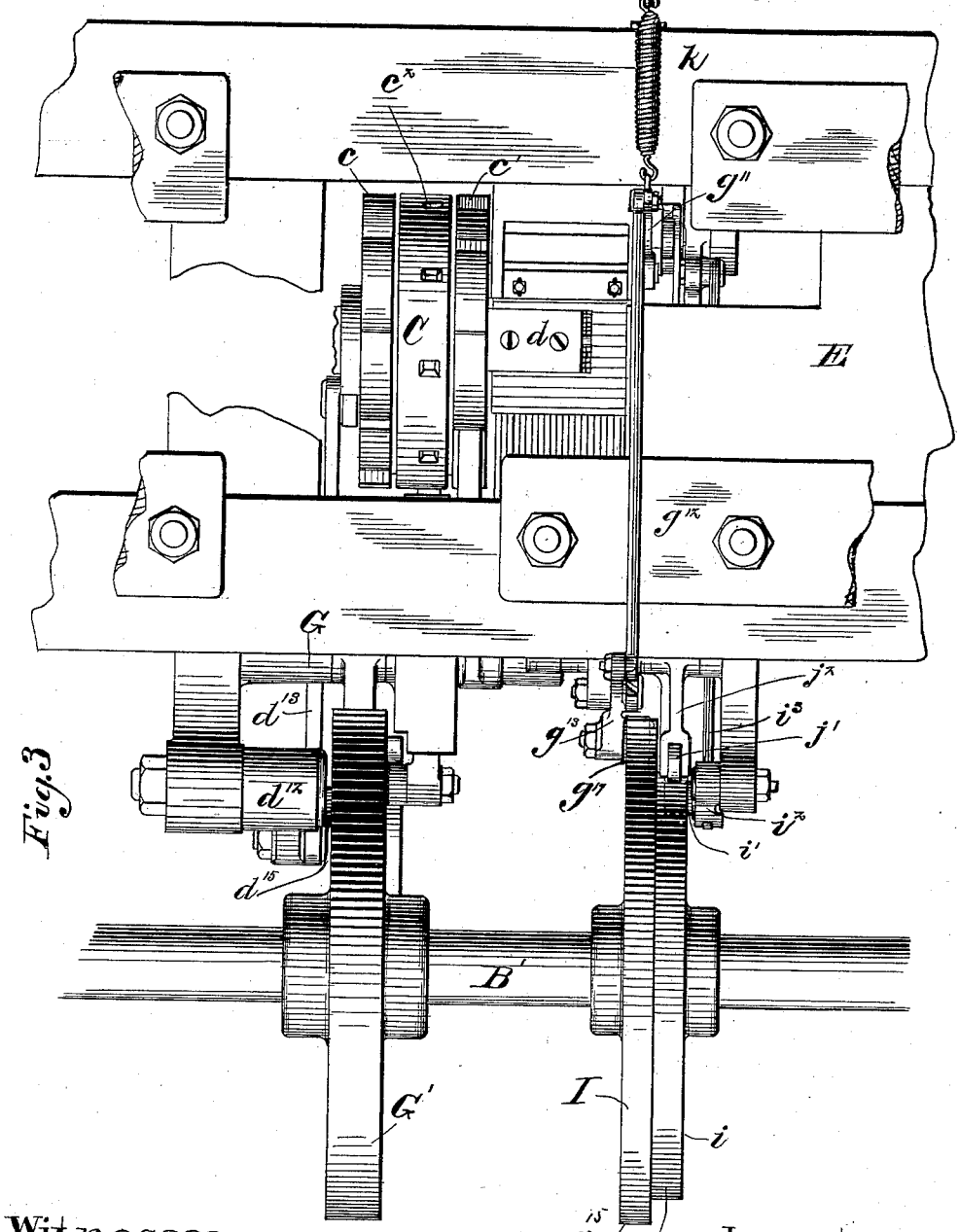
Figure 4:
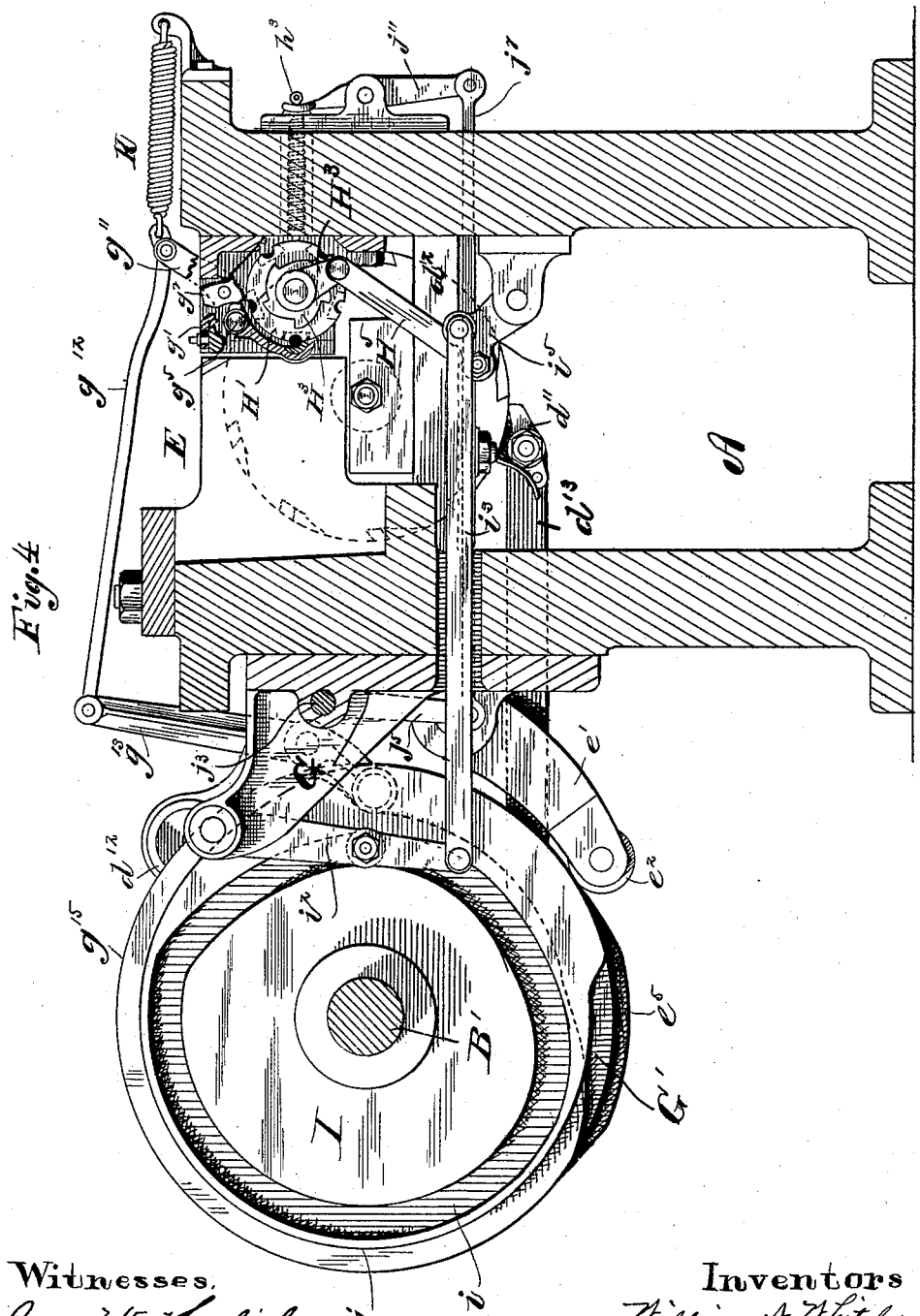
Figure 9:
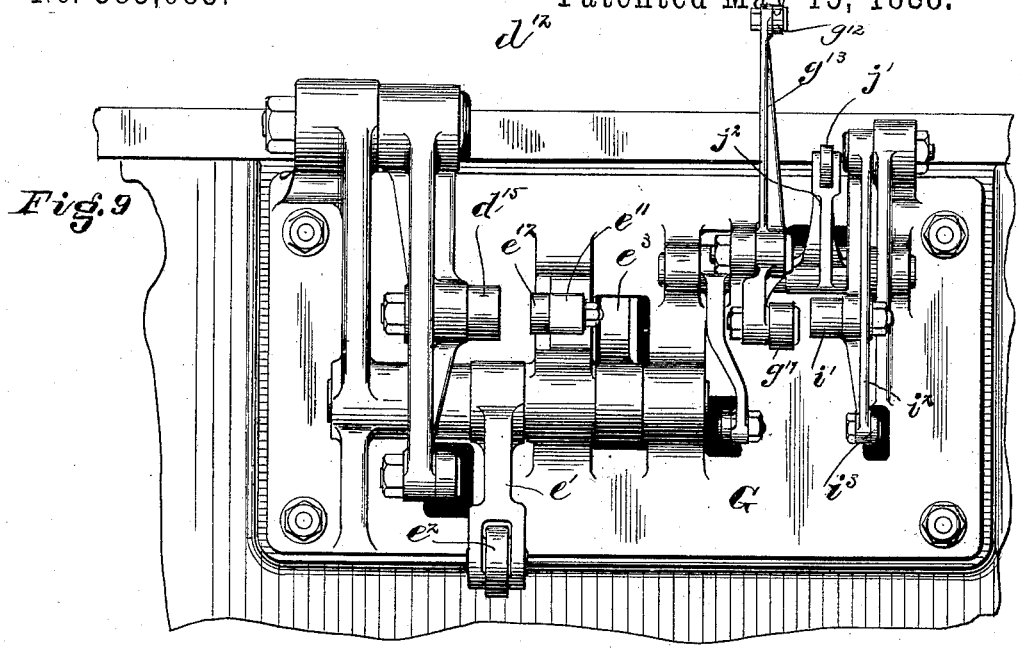
Figure 10:
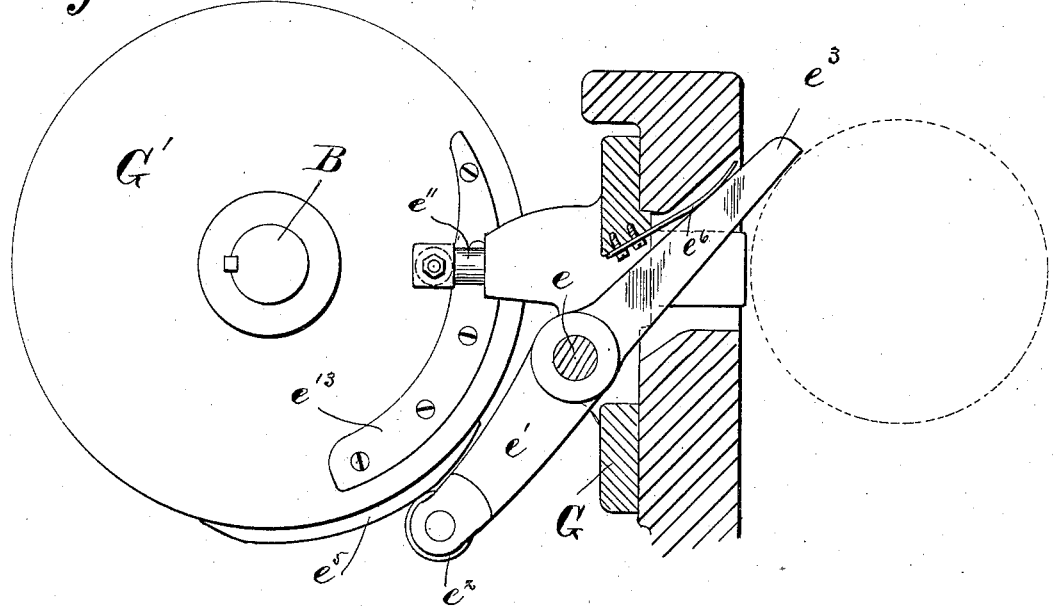
Figure 11:
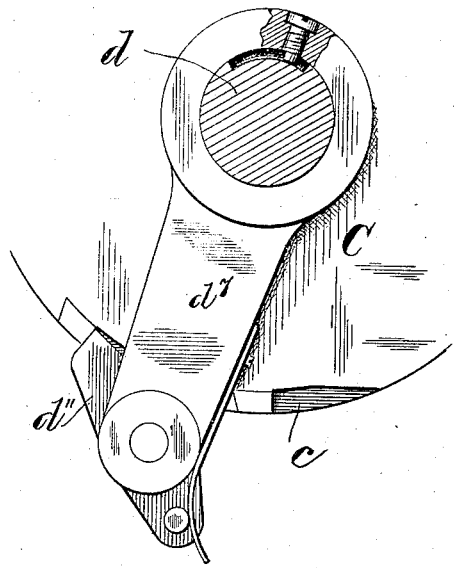
Figure 31:
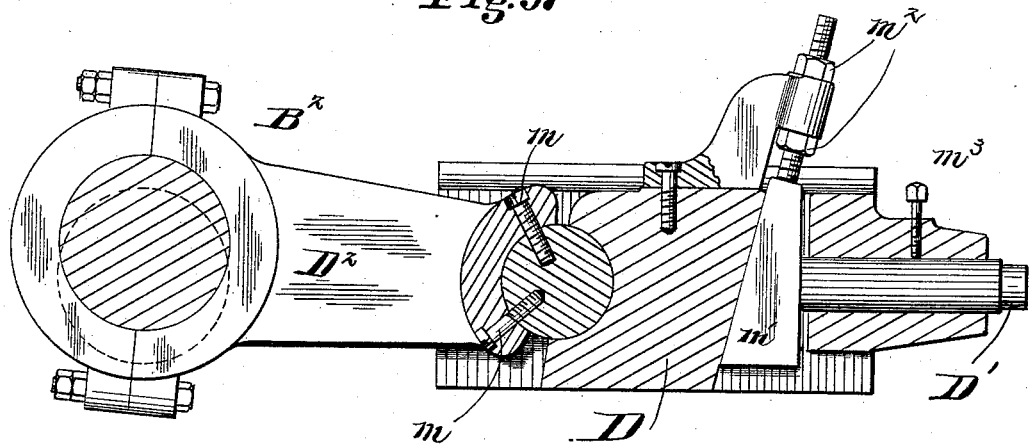
Figure 32:
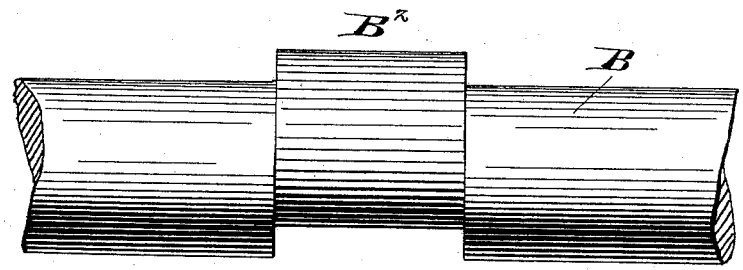
Figure 33:
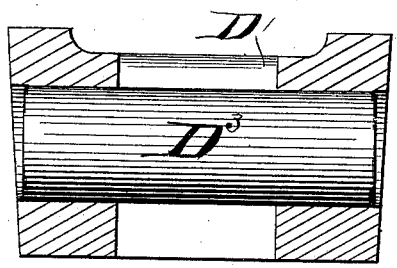
Figure 34:
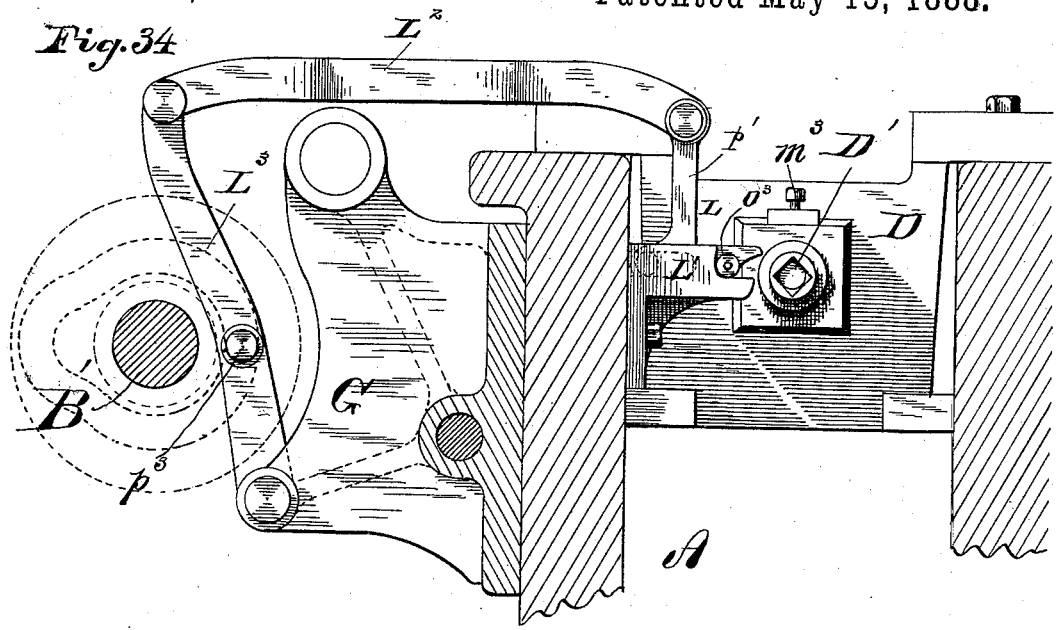
Figure 35:
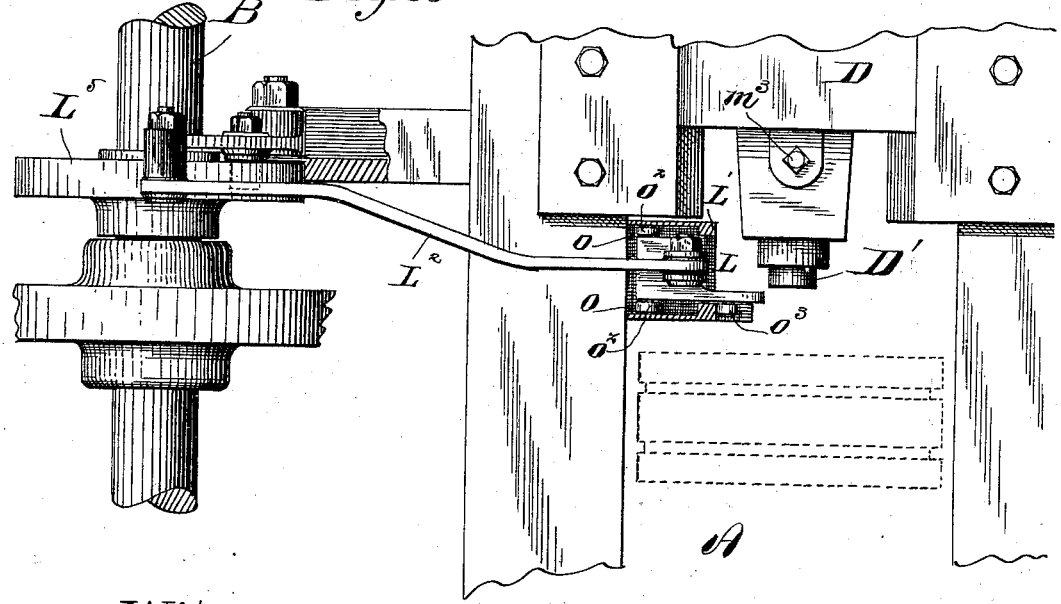

In the accompanying drawings, Figure 1 is a plan view of a machine embodying our invention. Fig. 2 is a longitudinal sectional elevation view of the same. Figs. 2ª and 2ᵇ are sectional views showing the arrangement for providing for the exit of the headed blanks. Fig. 3 is a partial plan view showing the arrangement of the cylinder and the feeding mechanism. Fig. 4 is a transverse sectional elevation of the same. Figs. 5 to 12, inclusive, are detailed views of the cylinder and the mechanism for driving the same. Figs. 13 to 23ᵇ, inclusive, are detailed views of the feeding and driving mechanism. Figs. 24 to 30, inclusive, are detailed views of the device for sustaining the feeding and discharging mechanism against the force of the blow during the operation of heading. Figs. 31, 32, and 33 are detailed views of the main shaft and connections for operating the main cross-head. Figs. 34, 35, 36, and 37 are detailed views of the "striking-out" mechanism. Figs. 38, 39, 40, and 41 are detailed views of the clutch mechanism for starting and stopping the machine.

Like parts are indicated by similar letters of reference throughout the several views.

In carrying out our invention we preferably employ a revolving cylinder journaled in any suitable manner in the main frame and located, preferably, at the center thereof. On each side of the revolving cylinder we provide a reciprocating cross-head, which cross-heads move to and from the said cylinder to perform the operations of feeding rods to and discharging blanks from the cylinder and heading the blanks. One of the cross-heads is supplied with a heading tool or hammer, adapted, as the cross-head is moved toward the cylinder, to be forced against and form a head on the blanks fed into the said cylinder. The other cross-head is provided with a series of pistons, which force the blanks from the feeding mechanism into the cylinder, hold them therein during the time they are being headed, and discharge them after the head is formed thereon.

The power to turn the machine is preferably supplied through a transverse shaft at one end of the main frame, the cross-head which carries the heading tool or hammer being connected directly to said shaft and driven therefrom by a suitable crank or cam connection. The movements of the cross-head carrying the feeding and ejecting mechanism and the movement of the cylinder are preferably derived from a longitudinal shaft supported in suitable bearings on one side of the main frame and connected by suitable gearing to the main or transverse shaft, to which the power is applied by a belt or other suitable means, a suitable clutch mechanism being provided between the source of power and the driven portions of the machine, by means of which the motion may be made continuous or intermittent, as desired.

Any suitable number of dies may be used in the cylinder, the said cylinder rotating a portion of a revolution corresponding to the number of dies therein at each stroke of the heading-tool and the feeding mechanism. The feeding and heading mechanisms, are so arranged and timed, one part with another, that the blanks are successively fed to the cylinder, and as the cylinder is advanced are carried to the heading mechanism, where a head is formed thereon, after which they are discharged, the construction and operation of the parts being such that a blank is fed to the cylinder and a headed bolt discharged therefrom at the same time, furnishing the means by which a headed bolt-blank is discharged from the machine at each stroke thereof.

In the accompanying drawings, A A represent the main frame.

B is the main shaft, journaled in suitable bearings at one end of the same.

B′ is the longitudinal shaft, connected by suitable gears to the main shaft B.

C is the cylinder, which contains the dies in which the blanks are headed.

D is the reciprocating cross-head which carries the heading tool or hammer D′, and which is connected by a pitman, $D^2$, to the crank $B^2$ on the main shaft B.

E is the feeding and supporting cross-head, which moves alternately to and from the cylinder C, in the manner hereinafter more fully described.

The main shaft B projects beyond the main frame A A, and is provided at one end with a spur-gear, $a$, engaging with a similar gear, $a'$, on a short shaft, $B^5$, which is supported on the frame A parallel with the main shaft B. Engaging the spur-gear on the short shaft $B^5$ is a miter-gear, $a^2$, engaging with a similar gear, $a^3$, on the longitudinal shaft B′. On the opposite end of said shaft is a miter-gear, $a^5$, which engages with a similar gear, $a^7$, secured on the end of a transverse shaft, $B^7$, which extends through the main frame A, and is supported in suitable bearings therein parallel with the main shaft B.

Extending transversely through the frame A, parallel with the shaft $B^7$, is a rock-shaft, $B^{11}$, on the opposite ends of which are secured projecting arms $b\ b$, provided with rollers $b'\ b'$, coming in contact with cams $b^2\ b^2$, secured on the opposite ends of the revolving shaft $B^7$. The rock-shaft is provided at or near its center with a rocking arm, E′, connected at its outer end by a pitman-connection, $E^2$, to the reciprocating feeding or supporting cross-head E. The cams $b^2\ b^2$ on the shaft $B^7$ are so arranged in connection with the projecting arms $b\ b$ that as the shaft $B^7$ is revolved the said cams alternately come in contact with the rollers $b'\ b'$ in the rocking arms $b\ b$, and thus produce a rocking motion of the shaft $B^{11}$, which, through the medium of the pitman-connection $E^2$, produces a reciprocating motion of the cross-head E. The gearing which connects the shaft $B^7$ with the shaft B′ and from thence to the main shaft B is so constructed that each revolution of the main shaft B produces one revolution of the shaft $B^7$. The cams $b^2$ are so formed that the rock-shaft $B^{11}$ is moved quickly in either direction, after which it remains at rest.

The cylinder C is preferably provided with nine openings of a size sufficiently large to receive the dies of the greatest diameter to be used. The dies $c^5$ are secured therein in such a manner that they may be readily removed when desired, and dies of a larger or smaller diameter inserted for making larger or smaller bolts. The dies are located in the cylinder at an equal distance from the center thereof and at an equal distance from each other. The cylinder is so supported in relation to the heading-tool D′ that as the cylinder is revolved each die is brought successively opposite the heading-tool and in a line therewith, means being provided for stopping and holding the cylinder at rest with each successive die opposite the said heading-tool. This is accomplished as follows: The cylinder is provided at opposite ends on its periphery with series of notches or ratchets $c\ c'$, equal in number to the number of dies contained therein, the ratchets in opposite ends of the cylinder being turned in opposite directions. On the periphery of the cylinder, near the middle of its length, is a series of openings or holes, $c^2$, preferably made slightly tapering toward the bottom thereof. The cylinder is journaled on a short shaft or arbor, $d$, which is supported at each end in suitable boxes, $d'$, on cross-pieces $d^2$, which extend transversely across the frame A. The boxes $d'$ are secured rigidly to the cross-pieces $d^2$. The arbor $d$ is preferably tapered in that portion thereof which forms the bearing for the cylinder, and is flattened at the ends and secured to the boxes $d'$ by bolts or screws $d^3$, which pass through slotted opening in the arbor $d$ to permit of an adjustment of the said arbor thereon by the adjusting-screws $d^5$, which pass through flanges or projections on the boxes $d'$, and serve to adjust the arbor $d$ longitudinally in either direction, and thus compensate for any wear thereon. (See Figs. 5 and 6.)

Journaled on the arbor $d$ at one end of the cylinder C is a vibrating arm, $d^7$, Figs. 7, 8, 9, 10, 11, and 12, on the outer end of which is pivoted a spring-pawl, $d^{11}$, engaging the ratchets $c$ on the periphery of the cylinder C. Pivoted at one end to the vibrating arm $d^7$ and at the other to an arm, $d^{12}$, on the outside of the main frame is a connecting-bar, $d^{13}$. The arm $d^{12}$ is pivoted to a suitable bearing on a plate, G, secured to the outside of the main frame A, and is provided at or near its center with a roller, $d^{15}$, engaging a cam groove, $d^{17}$, in a cam, G′, fixed upon the longitudinal shaft B′.

Journaled in suitable bearings on the plate G is a small rock-shaft, $e$, to which is secured at one point an arm, $e'$, provided at its outer end with a roller, $e^2$, bearing against the face of the cam G', and provided at another point with an inwardly-extending pawl-arm, $e^3$, engaging with the ratchets $c'$ on the periphery of the cylinder C. On the periphery of the cam G' is a projection, $e^5$, adapted, as the cam G' is revolved, to come in contact with the roller $e^2$ and press said roller from the cam, thus disengaging the pawl-arm $e^3$ from the ratchet $c'$, the said pawl-arm being adapted, as the projection $e^5$ passes the roller, to be returned to its normal position and into engagement with the said ratchets $c^2$ by a spring, $e^6$. (See Fig. 10.)

Journaled in a bearing in the plate G is a spring-bolt, $e^7$, adapted in its normal position to engage in one of the holes $c^3$ in the periphery of the cylinder and thus hold said cylinder from revolving in either direction. The spring-bolt $e^7$ is provided at its outer end with an adjustable head, $e^{11}$, provided with a roller, $e^{12}$, engaging a cam projection, $e^{13}$, on one side of the cam G'.

The cam-faces and projections on the cam G' are so arranged one with the other and with the parts on which they operate, and the cam G' is so arranged in relation to the driving mechanism, that as the cross-heads D and E are moved away from the cylinder C the connecting-bar $d^{13}$ is drawn back by the cam-groove $d^{17}$ until the spring-pawl $d^{11}$ is brought into engagement with one of the turning ratchets $c$. At the same time the pawl-arm $e^3$ is disconnected from the holding-ratchet $c'$ by the cam projection $e^5$ coming in contact with the roller $e^2$ in the arm $e'$. The cam projection $e^{13}$ in the meantime has come in contact with the roller $e^{12}$ and withdraws the spring-bolt $e^7$, thus releasing the cylinder C, which is now revolved by the spring-pawl $d^{11}$, which, actuated by the cam-groove $d^{17}$, starts in the opposite direction. Soon after the holding-ratchet $c'$, with which the pawl-arm $e^3$ was engaged, has passed the end of said pawl-arm the cam projection $e^5$ passes the roller $e^2$ and permits said pawl-arm to come in contact with the holding-ratchet $c'$. As the next successive ratchet comes in contact with the pawl-arm, the cylinder is stopped thereby, the connecting-bar $d^{13}$ having by this time reached the limit of its stroke. At this point the spring-bolt $e^7$ is released by the cam projection $e^{13}$, and is forced into one of the openings $d^3$, thus firmly locking the cylinder from further revolution in either direction.

As above stated, the blanks are fed into dies in the cylinder, supported therein during the time the blanks are being headed, and afterward ejected therefrom. In order to perform these different functions we provide the feeding and supporting cross-head E with a series of plungers, four in number. (See Figs. 13, 14, 23, $23^a$, and $23^b$.) These plungers come opposite to as many dies in the cylinder C, the supporting-plunger $f$ being adapted to enter the die opposite to and in a line with the heading-tool D' just previous to the stroke of the latter. Immediately preceding the supporting-plunger $f$ is the feeding-plunger $f'$, adapted (as the cross-head E is moved forward) to enter the die immediately preceding the one in which the supporting-plunger has entered and force a blank from the feeding mechanism into the cylinder ready to be supported by the supporting-plunger $f$ and headed by the heading-plunger D'. Immediately following the supporting-plunger $f$, in the direction in which the cylinder revolves, is the starting-plunger $f^2$, and on the other side of that is the ejecting-plunger $f^3$. The blanks are fed to a position in front of the feeding-plunger $f^2$, in a manner hereinafter described.

As the cross-head E is moved toward the cylinder, the feeding-plunger $f'$ carries the blanks into the die $c^5$, which immediately precedes the heading-tool D'. As the cross-head E is moved from the cylinder C, it is revolved one notch, in the manner above described, carrying the die containing the blank opposite the heading-tool D' and in a line with the supporting-plunger $f$. At the same time another blank is fed into position before the feeding-plunger $f'$. The cross-head E is again moved forward, carrying the blank into the cylinder, and at the same time bringing the supporting-plunger $f$ against the blank already therein. The heading-tool D' is brought forward against the said blank and forms a head thereon, after which the cross-heads D and E are withdrawn and the cylinder again revolved. At the next stroke of the cross-head E a new blank is fed to the cylinder, the blank already headed being carried opposite the starting-plunger $f^2$, which loosens it in the die and carries it a short distance longitudinally therein. At the next stroke the headed blank is ejected by the ejecting-plunger $f^3$, a new blank being fed at each stroke and a head formed on the blank immediately preceding, thus producing a headed bolt-blank at each stroke of the machine.

In order that the blank to be fed to the cylinder may be placed directly and positively in front of the feeding-plunger $f'$ and guided into the die as the blank is advanced, we provide a feeding device adapted to seize the blank and carry it to a position in front of and in a line with the feeding-plunger $f'$, and hold it in its place until the feeding-plunger advances and forces it into the cylinder. (See Figs. 17 to 21, inclusive.) This we preferably accomplish as follows: Secured to the main frame A, on the inner side thereof, and immediately behind the cylinder C, is the feeding-case H. This feeding-case H is closed at the top with the exception of the longitudinal opening $g$, which may be varied in size by a sliding gage, $g'$. Pivoted in the feeding-case H, and adapted to form one side of the opening $g$, is an oscillating retaining-plate, $g^2$, held normally in an upright position by a spring, $g^3$, and oscillated in such a manner as to open and close the throat or opening $g$, as hereinafter described.

Journaled in suitable bearings under the slide $g'$ is a rock-shaft, $g^5$, provided with a series of cam projections or fingers, $g^7$. The rock-shaft $g^5$ is provided at the outer end with a vibrating arm, $g^{11}$, to the outer extremity of which is attached a connecting-rod, $g^{12}$, which extends across the main frame A and connects with a vibrating arm, $g^{13}$, adapted to be acted upon by a cam, I, on the longitudinal shaft B', as hereinafter more fully described.

The fingers or cam projections $g^7$ on the rock-shaft $g^5$ are so constructed and arranged in relation to the retaining-plate $g^2$ that as the shaft $g^5$ is turned forward the cam projections $g^7$ come in contact with the retaining-plate and oscillate it on its bearings, thus closing the throat or opening $g$, the retaining-plate $g^2$ being returned to its normal position by the spring $g^3$ as the cam projections are withdrawn therefrom, thus opening the throat $g$.

Journaled in the lower part of the case H is a revolving cylinder, H', which we term the "feeding-cylinder." This cylinder is provided with a series of semicircular grooves or openings, $h$, in the periphery thereof, which extend throughout its entire length. These grooves or openings $h$ are formed on the arc of a circle whose radius is the same as the radius of the dies in the main cylinder. Instead of having the grooves formed directly in the cylinder H', they are preferably formed in detachable plates $h'$, adapted to be inserted in the periphery of the cylinder H' in such a manner that they may be removed therefrom and replaced by others having a different radius.

The feeding-case H and the feeding-cylinder H' are so arranged with reference to the main cylinder C that when the feeding-cylinder is in its normal position one of the grooves stands opposite to the die in the main cylinder to receive the blank and in a line with the feeding-plunger $f'$, the next successive groove in the said cylinder standing just below the throat $g$ and under the rock-shaft $g^5$ and the retaining-plate $g^2$. Means are provided for rotating the cylinder H' a portion of a revolution corresponding to the number of grooves therein at each movement of the main cylinder C. This is preferably accomplished from the cam I, which is provided on one side with a cam groove, $i$, adapted to receive a roller, $i'$, in a vibrating arm, $i^2$, pivoted at one end to a suitable support on the plate G and attached at the other end to a connecting-rod, $i^3$, which extends through the frame A and is attached at the other end to a bell-crank lever, $i^5$.

On the outer end of the shaft which supports the feeding-cylinder H' is a ratchet-wheel, H², adapted to be engaged by a spring-pawl, H⁴, pivoted to a vibrating arm, H³, which is journaled on the end of the shaft supporting the feeding-cylinder. Extending from the bell-crank $i^5$, Fig. 4, to the vibrating arm H³ is a pitman-connection, H⁵, which thus establishes a direct connection from the cam I to the feeding-cylinder H'. The cam-groove $i$ in the cam I is so constructed and arranged in relation to the main cam G' that the feeding-cylinder H' moves simultaneously with the main cylinder C and completes its movement just before the main cylinder comes to rest.

In the periphery of the feeding-cylinder H', between the grooves therein and preferably about the middle of the length thereof, is a series of retaining notches or openings, $h^2$, Fig. 18, equal in number to the grooves in the periphery of the cylinder, and adapted to be engaged, as the cylinder reaches the limit of its movement, by a spring-bolt, $h^3$, located in one side of the main frame A. The spring-bolt is adapted to be withdrawn, and thus release the feeding-cylinder at the proper time, by the cam I, which is provided on its periphery with a cam-face, $j$, adapted to act on a roller, $j'$, (see Fig. 9,) in the end of a vibrating arm, $j^2$, which, through the medium of a rock-shaft, $j^3$, arm $j^5$, connecting-rod $j^7$, and lever $j^{11}$, Fig. 4, produces a longitudinal movement of the spring-bolt $h^3$, sufficient to remove it from the retaining-notches $h^2$. The retaining-notches $h^2$ are preferably inclined on the side toward which the cylinder revolves, as shown at $h^5$, Fig. 18, but are formed with a straight shoulder on the other side. As the feeding-cylinder H' approaches the completion of its movement, the spring-bolt $h^3$ is released by the cam-face $j$ and presses against the incline $h^5$ of the retaining-notch $h^2$, and as the cylinder continues to revolve comes against the straight shoulder on the opposite side of the opening, and thus arrests the motion of the said cylinder. As soon as the cylinder comes to rest, the spring-bolt is forced into the retaining-notch, and thus holds the said cylinder against revolution in either direction.

Extending from the rock-shaft $g^5$, Fig. 18, to a point slightly below the center of the feeding-cylinder H' is a cover, H⁷, bolted at either end to the feeding-case H and curved at the center to conform to the curvature of the feeding-cylinder, a space being left between the said cover and the periphery of the cylinder equal to the difference between the depth of the grooves in said cylinder and the diameter of the blank to be fed thereby.

The cover H⁷ is shaped at its upper end to conform to the rock-shaft $g^5$ and the projections $g^7$, and is hollowed out at its lower end to receive a sleeve, $h^7$, which extends through the feeding-case H and projects into the cross-head E, as hereinafter more fully described. This sleeve $h^7$ is bored out to receive the feeding-plunger $f'$, and is cut away for a portion of its length, equal to the length of the feeding-cylinder, to form a continuation of the passage between the cover H⁷ and the feeding-cylinder H', the respective grooves in the feeding-cylinder being adapted to form a continuation of the said sleeve when brought to rest opposite thereto. One end of the sleeve $h^7$ comes close up to the die $c^5$ in the main cylinder C, into which the blanks are adapted to be fed, so that when the two cylinders are at rest a continuous passage is formed through said sleeve and die.

The rock-shaft $g^5$ and the cam projections $g^7$ thereon are adapted to be held in their normal position, with the throat $g$ open, by means of a cam-face, $g^{15}$, on the cam I, Fig. 4, which acts against the roller $g^{17}$ in the end of the vibrating arm $g^{13}$, which is pivoted at the center to a suitable support on the plate G and connected to the rock-shaft $g^5$, as hereinbefore described.

Connected at one end to the vibrating arm $g^{11}$ on the rock-shaft $g^5$ and at the other to a suitable connection on the main frame A is a spring, K, adapted, as the arm $g^{13}$ is released by the cam-face $g^{15}$, to throw the vibrating arm $g^{11}$ over to the position shown in Fig. 19, thus bringing the cam projections $g^7$ in contact with the retaining-plate $g^2$ and closing the throat $g$. The blank to be fed to the cylinder is placed in the throat $g$, Figs. 4 and 18, and drops against the retaining-plate $g^2$ and the cam projection $g^7$, as indicated by the lower dotted circle in Fig. 18. As the cross-head E begins to recede, the arm $g^{13}$ is released by the cam-face $g^{15}$. The spring K throws the vibrating arm over, thus bringing the cam projections $g^7$ into contact with the blank in the throat $g$. The retaining-plate $g^2$ recedes as the cam projections $g^7$ advance, and the blank is carried by the said projections and dropped into the groove $h$ in the feeding-cylinder H, which is immediately under the throat $g$. As soon as the cross-head E has reached the limit of its backward stroke, the feeding-cylinder H' begins to revolve (the spring-bolt $h^3$ having in the meantime been withdrawn therefrom) and carries the blank therein to a position directly in front of the die in the main cylinder, which is to receive the same, and which, in the meantime, has been brought forward by the movement of the said main cylinder C.

The cross-head E is cut away on the side next to the feeding-case to make room for the same. (See Fig. 1.) The feeding-plunger $f'$ in the said cross-head, instead of being secured rigidly therein, reciprocates in a suitable bearing in the cross-head E. The rocking arm E' on the transverse shaft B$^{11}$, Figs. 2, 14, and 15, is extended beyond the point at which the pitman E$^2$ is connected thereto, the extended portion $k$ being provided with a slotted opening, $k'$, in which is secured a wrist-pin, $k^2$. The feeding-plunger $f'$ is secured in the end of a sliding shaft, $k^3$, which projects through the cross-head E, and is provided on the outer end with a variable collar, $k^5$. Extending from the variable collar $k^5$ to the wrist-pin $k^2$ is a connecting-bar, $k^7$.

It will be seen that as the cross-head E is reciprocated backward and forward the feeding-plunger $f'$ will receive an additional movement by reason of the greater leverage by which it is connected to the transverse shaft B$^{11}$.

As before stated, the sleeve $h^7$ projects into the cross-head E to such an extent that the feeding-plunger $f'$ always remains therein. It will be seen now that after the blank is brought to the position in front of the feeding-plunger and in a line with the die into which it is to be fed the forward movement of the feeding-plunger will carry the said blank successively into the said die to the required distance, the feeding-plunger $f'$ being adjusted to the proper length for this purpose by means of the variable collar $k^5$.

As before stated, the retaining-plate $g^2$, Fig. 18, is forced backward by the projections $g^7$ on the rock-shaft $g^5$ as the blank is carried down into the receiving-groove of the feeding-cylinder H'. This movement of the retaining-plate, it will be seen, causes the upper portion of the said plate to approach the slide $g'$, thus closing the opening or throat $g$. In order to prevent two or more blanks being fed to the machine at the same time, we so construct the retaining-plate $g^2$ and cam projections that there is only sufficient room below the throat $g$ for one blank. We also form that portion of the slide $g'$ and the retaining-plate $g^2$ which forms the sides of the throat $g$ at such an angle that, in case two or more blanks were dropped therein at the same time, the closing of the throat by the retaining-plate would expel all the blanks except the one between the retaining-plate and the cam projections. By this construction it will be seen that a positive feed is established by which the blanks are fed directly to the cylinder, and means are provided by which but one blank can enter the feeding mechanism at any time.

From the foregoing description it will be seen that at each revolution of the main shaft B' a blank is automatically fed to the machine, a head is formed on one of the blanks therein, and a headed blank automatically discharged therefrom. The plunger $f$, as before stated, supports the blank during the operation of heading and sustains the shock which comes thereon. In order that the plunger may be supported rigidly during this time, and in order to relieve the working parts of the machine from any undue strain during the operation of heading, we provide means for connecting the plunger $f$ directly with the main frame during the time the blow is delivered, thereby transferring the shock directly to the solid portions of the frame. This we preferably accomplish as follows: The plunger $f$ is supported in the end of a round rod or piston, $l$, which extends into the cross-head E, Figs. 23, 23$^a$, and 23$^b$, and rests at its inner end against a variable key, $l'$, adapted to be moved longitudinally in a slot, $l^2$, in said cross-head. The key $l'$ is provided with a threaded extension, $l^3$, provided with adjusting-nuts, by means of which it may be raised or lowered, as desired, thus adjusting the rod $l$ and plunger $f$ to the proper position to hold the blank during the operation of heading.

On the rear end of the cross-head E are projections $l^5$. Immediately back of the crosshead E, and in a line with the projections $l^5$, are supporting-arms $l^7$, Figs. 26, 27, and 28, which are secured in a rock-shaft, $B^{12}$. This shaft $B^{12}$ is journaled in suitable bearings in the main frame A, and is provided at its extremities with rock-arms $b^5$, which are provided with friction-rollers $b^7$, engaged by cams $b^{11}$, one of said cams moving the arms $b^7$ in one direction and the other cam returning the said arms to their normal position. Immediately back of the shaft $B^{12}$ and in a line with the arms $l^7$ are bearing-blocks $l^{11}$ bearing against the rear end of the supporting-arms $l^7$. These bearing-blocks $l^{11}$ are supported in the main frame A, and are adjusted therein by variable keys $l^{12}$, Fig. 28, which rest at one side against the solid portion of said frame and at the other against the said bearing-blocks $l^{11}$. The cams $b^{11}$ are located on the shaft $B^7$, which also carries the cams $b^2$, which moves the cross-head E. The cams $b^{11}$ are so constructed and arranged that as the cross-head E reaches the limit of its forward stroke the arms $l^7$ are moved down immediately behind the crosshead E, with their forward ends resting against the projections $l^5$ on the said cross-head, thus forming a rigid connection between said crosshead and from thence to the supporting-plunger $f'$ and the solid portion of the main frame. The variable keys $l^{12}$ and $l'$ furnish the means of readily adjusting the parts to the proper position and to compensate for all wear thereon.

The cross-head D is reciprocated to and from the cylinder C at each revolution of the main shaft B by the crank $B^2$ on the said shaft. The pitman $D^2$, which extends from said crank to the said cross-head, is provided with a yoke at one end encircling the crank $B^2$, and at the other end with a concave surface bearing against a short shaft or trunnion, $D^3$, journaled at each end in suitable bearings in the crosshead D. The inner end of the pitman $D^2$ is connected to the shaft $D^3$ by screws $m$. The bearings for the said shaft $B^3$ in the cross-head extend on one side of said shaft throughout its entire length. The heading-tool $D'$ is made separate from the cross-head D, and is supported at its inner end against a variable key, $m'$, in the upper end of which is a threaded rod provided with suitable adjusting-nuts, $m^2$, by means of which it may be moved in or out, as desired. A small set-screw, $m^3$, serves to hold the heading-tool $D'$ in position and prevents it from turning therein. It will be seen now that a rigid connection is formed directly from the main shaft B to the heading-tool $D'$ and from the supporting-plunger $f$ to the solid portion of the main frame A. The bearings for the main shaft B are made very heavy, so that all the strain comes directly on the main frame, the working parts being relieved therefrom. All the parts are adjustable, so that any wear may be readily compensated for and all lost motion obviated.

The starting and ejecting plungers $f^2$ and $f^3$, which serve to expel the headed blanks from the cylinder, are supported in the ends of the rods or pistons $n$, which extend through the cross head E, and are screw-threaded at one end and screwed into said cross-head, locking-nuts being provided for securing said rods in any desired position.

Each of the plungers $f'$ $f^2$, &c., is secured in the end of the rod or piston which supports them by small set screws $n^2$, (see Fig. 23$^b$,) and may be removed therefrom and replaced by others of different lengths when it is desired to head longer or shorter bolts. Each of the rods which support the plunger in the crosshead E is provided with a set-screw, $n^2$, which passes through the said cross head and bears against the said rod to hold the same in its position in the said cross-head.

The dies $c^5$ in the main cylinder, as before stated, are made adjustable therein. This we preferably accomplish by making the die in two pieces, one of which is made in the form of a sleeve. The inner part or die proper is provided with a shoulder or flange, and is screw-threaded for a portion of its length and screwed into the outer portion or sleeve. The outer portion or sleeve is countersunk in the cylinder, as is also the flange or shoulder of the die proper, so that when the parts are screwed together the die is tightly clamped in the said cylinder. By this construction the dies may be readily removed when desired and others of different diameters inserted. (See Figs. 5 and 6.) As before stated, the plates $h'$, which contain the grooves in the feeding-cylinder, are also removable, and may be replaced by others which contain grooves of a greater or less diameter. By removing the cover $H^7$ of the feeding-cylinder H the rock-shaft $g^5$ may be removed and replaced by one having larger or smaller projections, $g^7$. The sleeve $h^7$ may also be replaced by one of different size, so that by adjusting the throat $g^2$, by means of the adjustable slide $g'$, and changing the plungers $f$, $f'$, $f^2$, and $f^3$ in the crosshead E the machine may be readily adjusted so as to head rods of any desired diameter or length within the limit of the machine.

Figure 12:
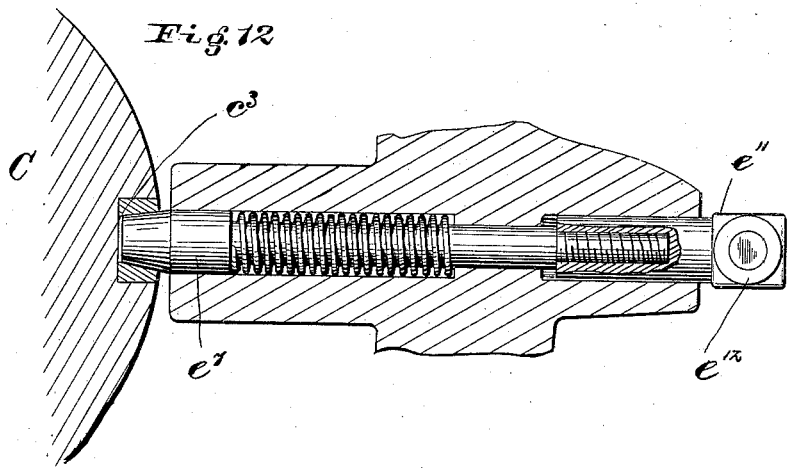
Figure 28:
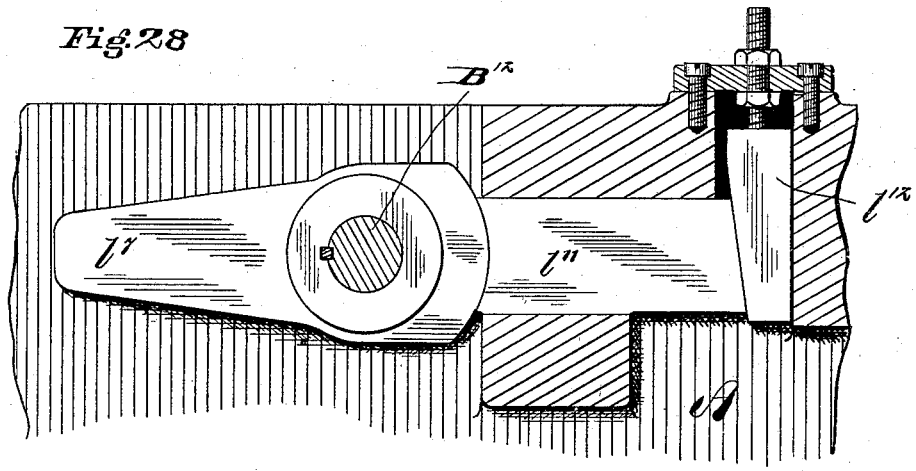
Figure 29:
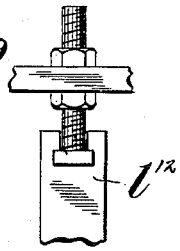
Figure 30:
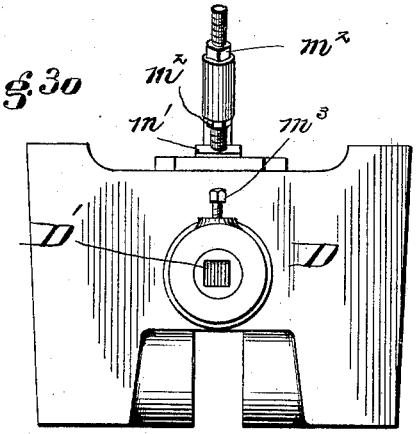

The notches $c$ and $c'$ in the periphery of the cylinder C are preferably provided with removable seats of steel, as shown in Fig. 6$^a$, so that any wear thereon may be compensated for by replacing the seats with others. The holes $c^3$, into which the spring-bolt $e^7$ engages, are also provided with removable seats, as shown in Fig. 12. It will be thus seen that all the parts of the machine are readily adjustable to compensate for wear or for making bolt-blanks of varying sizes and lengths.

The heading-tool $D'$ may be varied in size and shape, as desired, so that any form of head may be secured.

The headed blanks are expelled from the cylinder in the manner hereinbefore described. It may sometimes happen, however, that the head formed on the bolt will stick fast in the heading tool, and the bolt thus be withdrawn from the die, in which case, unless the bolt was removed from the said heading-tool, a disastrous result might follow at the next stroke thereof. To obviate this we provide a "knocking-out" arm or lever, adapted, after each stroke of the heading-tool D', to advance and strike downwardly in front of the tool, and in case the blank remains therein to strike the same therefrom. This striking-arm is shown at L in Fig. 34. It is supported on a bracket, L', on the main frame immediately in front of the cylinder C. The bracket L' is provided on each side with suitable tracks, $o$ and $o'$, on which rollers $o^2$ and $o^3$ on the sides of said striking-arm travel.

The striking-arm L is shown in perspective in Fig. 36, and consists of a triangular base, $p$, and an upwardly-projecting arm, $p'$, the base $p$ being provided on one side with a forwardly projecting lug, $p^2$.

The rollers $o^2$ travel in the tracks or grooves $o$ in the side of the bracket L' and support the rear end of the base $p$. The roller $o^3$ travels on the track $o'$ and supports the forward end of the base $p$. The upper end of the projecting arm $p'$ is connected to a bar, $L^2$, Fig. 34, which is attached at its other end to a rock-arm, $L^3$, pivoted to the main supporting-plate G. The rock-arm $L^3$ is provided with cam-roller $p^3$, engaging a cam-groove in a cam, $L^5$, on the longitudinal shaft B'. The groove in the cam $L^5$ is so constructed and arranged that as the cross-head D' approaches the limit of its backward stroke the striking-arm L is moved forward on the bracket L' until the roller $o^3$, which supports the forward end of the base, reaches the end of the short track $o'$ on the said bracket. This movement causes the projecting lug $p^2$ of the base to pass in front and slightly above the heading-tool D'. A continued movement of the connecting-bar $L^2$ causes the rear roller, $o^2$, to come against the ends of the grooves $o$, in which they travel, thus arresting the motion of the base and causing the forward portion thereof to be turned downward, carrying the projecting lug across the face of the heading-tool and striking out the bolt in case it is stuck therein. The end of the short track $o'$ is curved at $o^5$ on the arc of a circle struck from the center of the rollers $o^2$ when at the limit of their forward stroke. When the rollers $o^2$ come against the end of the grooves in which they travel, they form bearings on which the base turns to produce the striking motion of the arm, the forward roller, $o^3$, passing down along the curved track $o^5$. As the cam $L^5$ continues to revolve, the connecting-bar $L^2$ is drawn backward, causing the base $p$ of the striking-arm to turn on the axis formed by the rollers $o^2$, until the roller $o^3$ reaches the top of the track $o'$, when it moves backward in a horizontal plane in its normal position. The cam $L^5$ is so constructed that the movement of the striking-arm is completed and the arm turned to its position during the time the cross-head D remains nearly at rest, while the crank which operates the same is passing the dead-center.

In Figs. 38 to 41 we have shown the clutch mechanism connecting and disconnecting the driving-wheel from the main shaft B. Secured to the shaft B, between the driving-wheel and the main bearing, is a clutch collar, M, provided in its face with a short groove or mortise, $r$. Located in the hub of the driving-wheel is a spring bolt or pawl, $r'$, at the same distance from the center of the shaft B as the mortise or opening $r$. Immediately under the collar M is a variable cam track, $r^2$, on the end of a standard, $r^3$, which is pivoted at its lower end to the foot-lever F. The spring-bolt $r'$ is provided on one side with a projection, $r^5$, adapted to come in contact with the cam-track $r^2$ when said track is in its normal position, and thus withdraw the spring bolt or pawl from the clutch-collar, at which time the driving-wheel is adapted to turn loosely on the shaft B.

By pressing down on the foot-lever F the cam $r^2$ will be turned down, so that when the spring-pawl comes opposite the opening $r$ it will be forced therein and thus connect the driving-wheel and shaft so that they will revolve together. When the foot-lever F is released, a spring, $r^7$, returns the cam $r^2$ to its normal position, and thus withdraws the pawl $r'$. The cam $r^2$ is provided on one side with a projection, $r^{11}$, adapted, as the spring-pawl is withdrawn thereby, to come in contact with a projection, $r^{12}$, on the collar M, and thus stop the revolution of said collar and the shaft B. Means are thus provided by which a continuous operation of the machine may be secured or stopped and started at will.

The headed blank is expelled just under the bracket L', which supports the striking arm L, and over the cross-bar $d^2$, which supports the cylinder C. In order that the bolt may be readily discharged, we construct the cross-bar at this point at an angle, thus forming a trough or passage-way, $s$, as shown in Figs. 2, $2^a$, and $2^b$, from whence they are dropped into a suitable receptacle below.

In the operation of the machine the rods are first heated at one end, after which they are dropped into the throat $g$ of the feeding-chamber, from which they are automatically fed to the cylinder and pass through the series of operations above described until they are automatically ejected with a head finished thereon.

It is obvious that the various parts of this machine may be modified. Instead of providing the blanks cut to the proper length and heating them separately, an entire rod may be heated and fed to the machine in such a manner that at each stroke sufficient stock may be cut therefrom to form a bolt and be fed into the cylinder, the remaining operations being substantially the same. By this construction the machine may be used in connection with a rolling-mill, the rods from which the bolts are formed being passed through a furnace directly to the bolt-machine, cut to the proper length, and the heads finished thereon before the rod becomes cool.

The mechanism for driving the respective parts, it is obvious, may be changed, as desired. The machine, however, as described, it will be seen, is readily adjustable to all kinds of work and performs the operation of heading the blank and discharging the same therefrom at each revolution of the driving-wheel.

Instead of having the reciprocating crosshead, which carries the supporting-plunger, to support the blank during the operation of heading, a solid support may be used at one end of the cylinder, against which the end of the blank would rest during the operation of heading. It is evident that the blank might be fed from the front side of the cylinder instead of from the rear, if desired, and if a solid support were used at the rear this would probably be the preferable method of feeding the blanks. In this case the dies need be open at one end only, and would be made of a depth to correspond to the length of the bolt to be headed, suitable means being provided for withdrawing the headed blanks from the said dies.

Various other modifications of the organization and operation of the parts may be employed, which will readily suggest themselves to the mind of an ordinary mechanic.

Having thus described our invention, we claim—

1. The combination, with the intermittently-revolving cylinder and a heading-tool adapted to come in contact with the blanks therein, of a striking-lever and mechanism for operating the same, adapted to pass in front of the heading-tool after each stroke thereof, substantially as set forth.

2. The combination, with the intermittently-revolving cylinder provided with a series of dies therein and a heading-tool adapted to reciprocate to and from said dies, of a feeding-cylinder adapted during the movement of the main cylinder to carry the blanks successively in front of one of said dies in a position to be fed into the same, substantially as specified.

3. The combination, with the feeding-cylinder, of an opening or throat above said cylinder, a rock-shaft having projections thereon on one side of said throat, and a retaining-plate adapted to receive and hold the blanks dropped into said throat, said retaining-plate being automatically adapted to close said throat as the projections are moved to carry the blank to the feeding-cylinder, substantially as set forth.

4. The combination, in a bolt-heading machine, of a feeding device having a throat to receive the blanks from the hopper or other source of supply, and a retaining-plate adapted to open and close the inlet to said throat, said retaining-plate being so constructed that its movement in closing said throat will expel all the blanks except one from the said throat, substantially as set forth.

5. The combination, with the feeding-cylinder having a series of grooves therein, of a rock-shaft provided with a series of projections thereon, a retaining-plate adapted to be operated by said projections, and an adjustable slide above said rock-shaft adapted when the retaining-plate is in its normal position to form with said retaining-plate a throat for the reception of the blanks to be fed thereby, said plate being adapted to approach said slide and close the said opening as the rock-shaft is moved to carry the blanks to the feeding-cylinder, substantially as set forth.

6. The combination, with the feeding-cylinder having the grooves therein, of a rock-shaft with the projections above said cylinder adapted to carry the blanks downwardly and deposit them successively in the said grooves, the retaining-plate operated by said projections to open and close the opening above said shaft, and a spring adapted to operate said rock-shaft and a cam to return said rock-shaft to its normal position, substantially as set forth.

7. The combination, with the feeding-cylinder, of the rock-shaft with the projections thereon, and the retaining-plate above said cylinder, means for operating said rock-shaft and intermittently revolving said cylinder, and a retaining-bolt adapted to engage said cylinder and hold it at rest during the movement of said rock-shaft, and means for automatically withdrawing said bolt to permit the cylinder to revolve while the rock-shaft remains at rest, substantially as specified.

8. The combination, with the main cylinder having dies therein, of the cross-head containing a series of plungers adapted to enter the respective dies in said cylinder, and a feeding-plunger supported in a shaft having a bearing in said cross head, said shaft being adapted to move independently of said cross-head, substantially as set forth.

9. The combination, with the main cylinder and the feeding-cylinder adapted to carry the bolt in a position in front of the dies in said main cylinder, of a sleeve in said feeding device cut away at the central portion to permit the blank carried by the feeding device to enter therein, the cross-head having a feeding-plunger capable of a movement therein, said sleeve being adapted to enter said cross-head, and said plunger being adapted to enter said sleeve, and means for moving said cross-head and feeding-plunger at different speeds, substantially as set forth.

10. The combination, with the main cylinder and the feeding-cylinder, of the cross-head provided with a series of plungers adapted to enter the dies in said main cylinder, a feeding-plunger adapted to move independently of said cross-head and pass through the respective grooves in said feeding-cylinder, a rock-shaft provided with a vibrating arm connected to said cross-head, said arm being extended and connected to said feeding-cylinder, and means for operating said rock-shaft and thus reciprocating said cross-head and feeding-plunger at different speeds, substantially as set forth.

11. The combination, with the main frame and cylinder provided with a series of dies therein, of a cross-head having a supporting-plunger adapted to successively enter said dies, a vibrating arm in the rear of said cross-head adapted, as the cross-head reaches the limit of its forward stroke, to form a connection between said cross-head and the main frame, and means for adjusting the bearing between said arms and main frame, substantially as set forth.

12. The combination, with the movable dies, the heading-tool at one side thereof, and the supporting-plunger at the other, of a movable head in which said supporting-plunger is secured, a variable key in said head for adjusting said plunger, a set-screw for holding said plunger therein, the supporting-arms adapted to form a rigid connection from said head to the main frame, sliding bearings in said main frame against which the supporting-arms rest, and means for adjusting said sliding bearings, substantially as set forth.

13. The combination, with the removable dies and the heading-tool and the supporting-plunger, of the head in which said supporting-plunger is secured, a rock-shaft having a vibrating arm adapted to move said head, a revolving shaft provided at either end with cams adapted to operate upon said rock-shaft and alternately move it in opposite directions, and means for connecting said revolving shaft to the mechanism which drives the heading-tool, substantially as set forth.

14. The combination, with the cylinder provided with a series of dies therein, of the heading tool adapted to reciprocate in front of one of said dies, a reciprocating head supporting the series of plungers adapted to enter said dies, a rock-shaft having an extending arm adapted to move said head, one of said plungers being extended through said head and adapted to slide therein, and a connection from the extended portion of said arm to said sliding plunger, and a variable collar on said sliding plunger, to which the connection is made, substantially as specified.

15. The combination, with the intermittently-revolving cylinder having dies therein and the heading-tool adapted to reciprocate in front of one of said dies, of a striking-lever provided at the base with bearings on which lever is adapted to reciprocate, one of said bearings being so constructed that when the lever reaches a given point it leaves said bearing, while the other bearing forms a pivot on which said lever turns to produce a downward striking motion thereof, substantially as set forth.

16. The combination, with the heading tool, of the striking-lever adapted to reciprocate in front thereof, a bracket adapted to support said striking-lever, provided with tracks on which the lever is adapted to reciprocate, and rollers on said lever adapted to travel on said track, one of said tracks being of such length that when the lever reaches a given point the roller leaves the said track, while the other roller forms a pivot on which the lever is adapted to turn, substantially as set forth.

In testimony whereof we have hereunto set our hands this 31st day of December, A. D. 1886.

WILLIAM N. WHITELEY.
OSCAR E. PERRIGO.
A. S. PERRIGO.

Witnesses:
WILLIAM F. BEVITT,
FRED STATE.